(12) United States Patent
Barnhill et al.

(10) Patent No.: US 11,813,799 B2
(45) Date of Patent: Nov. 14, 2023

(54) CONTROL SYSTEMS AND METHODS FOR ADDITIVE MANUFACTURING

(71) Applicant: General Electric Company, Schenectady, NY (US)

(72) Inventors: Christopher David Barnhill, Cincinnati, OH (US); Robert Edgar Estes, Cincinnati, OH (US); William Joseph Steele, Lawrenceburg, IN (US); Trent William Muhlenkamp, Cincinnati, OH (US); Zhen Liu, Niskayuna, NY (US); John Thomas Sterle, Clifton Park, NY (US); Victor Wayne Fulton, Amelia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/884,032

(22) Filed: Aug. 9, 2022

(65) Prior Publication Data

US 2023/0064479 A1 Mar. 2, 2023

Related U.S. Application Data

(60) Provisional application No. 63/239,530, filed on Sep. 1, 2021.

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/124* (2017.08); *B29C 64/245* (2017.08);
(Continued)

(58) Field of Classification Search
CPC ... B29C 64/393; B29C 64/124; B29C 64/282; B29C 64/245; B33Y 10/00; B33Y 3/00; B33Y 50/02
(Continued)

(56) References Cited

U.S. PATENT DOCUMENTS 1,990,749 A 2/1935 Phillips et al.
2,259,517 A 10/1941 Drenkard, Jr.
(Continued)

FOREIGN PATENT DOCUMENTS

CN 101628477 A 1/2010
CN 103210344 A 7/2013
(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10f1a369c2239943e6506f27ba920bd4dd9359078e744369695ab6ffbde75c6c?filename=Admaflex%20300%20brochure.pdf&sig=hQvDlzxkSmFOZwjM.
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

An additive manufacturing apparatus includes a first print module includes a first stage configured to hold a first component and a first radiant energy device. The resin support is configured to be positioned between the first stage and the first radiant energy device. A second print module includes a second stage configured to hold a second component and a second radiant energy device. The resin support is configured to be positioned between the second stage and the second radiant energy device. A control system is configured to translate the resin support based on a condition
(Continued)

of the first print module and the second print module through the first print module and the second print module.

20 Claims, 9 Drawing Sheets

(51) Int. Cl.
  *B33Y 30/00* (2015.01)
  *B33Y 50/02* (2015.01)
  *B29C 64/124* (2017.01)
  *B29C 64/282* (2017.01)
  *B29C 64/245* (2017.01)

(52) U.S. Cl.
  CPC ............ *B29C 64/282* (2017.08); *B33Y 10/00* (2014.12); *B33Y 30/00* (2014.12); *B33Y 50/02* (2014.12)

(58) Field of Classification Search
  USPC ........................................................ 264/401
  See application file for complete search history.

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |

(56) References Cited

U.S. PATENT DOCUMENTS

| | | | |
|---|---|---|---|
| 7,438,846 | B2 | 10/2008 | John |
| 7,455,804 | B2 | 11/2008 | Patel et al. |
| 7,520,740 | B2 | 4/2009 | Wahlstrom et al. |
| 7,550,518 | B2 | 6/2009 | Bredt et al. |
| 7,555,726 | B2 | 6/2009 | Kurtenbach et al. |
| 7,569,174 | B2 | 8/2009 | Ruatta et al. |
| 7,572,403 | B2 | 8/2009 | Gu et al. |
| 7,575,682 | B2 | 8/2009 | Olsta et al. |
| 7,578,958 | B2 | 8/2009 | Patel et al. |
| 7,614,866 | B2 | 11/2009 | Sperry et al. |
| 7,614,886 | B2 | 11/2009 | Sperry et al. |
| 7,636,610 | B2 | 12/2009 | Schillen et al. |
| 7,698,947 | B2 | 4/2010 | Sarr |
| 7,706,910 | B2 | 4/2010 | Hull et al. |
| 7,742,060 | B2 | 6/2010 | Maillot |
| 7,758,799 | B2 | 7/2010 | Hull et al. |
| 7,767,132 | B2 | 8/2010 | Patel et al. |
| 7,771,183 | B2 | 8/2010 | Hull et al. |
| 7,780,429 | B2 | 8/2010 | Kikuchi |
| 7,783,371 | B2 | 8/2010 | John et al. |
| 7,785,093 | B2 | 8/2010 | Holmboe et al. |
| 7,790,093 | B2 | 9/2010 | Shkolnik et al. |
| 7,795,349 | B2 | 9/2010 | Bredt et al. |
| 7,815,826 | B2 | 10/2010 | Serdy et al. |
| 7,845,930 | B2 | 12/2010 | Shkolnik et al. |
| 7,867,302 | B2 | 1/2011 | Nevoret et al. |
| 7,892,474 | B2 | 2/2011 | Shkolnik et al. |
| 7,894,921 | B2 | 2/2011 | John et al. |
| 7,931,460 | B2 | 4/2011 | Scott et al. |
| 7,962,238 | B2 | 6/2011 | Shkolnik et al. |
| 7,964,047 | B2 | 6/2011 | Ishida |
| 7,995,073 | B1 | 8/2011 | Shemanarev et al. |
| 8,003,040 | B2 | 8/2011 | El-Siblani |
| 8,071,055 | B2 | 9/2011 | Davidson et al. |
| 8,029,642 | B2 | 10/2011 | Hagman |
| 8,048,261 | B2 | 11/2011 | McCowin |
| 8,070,473 | B2 | 12/2011 | Kozlak |
| 8,105,066 | B2 | 1/2012 | Sperry et al. |
| 8,110,135 | B2 | 2/2012 | El-Siblani |
| 8,126,580 | B2 | 2/2012 | El-Siblani et al. |
| 8,157,908 | B2 | 4/2012 | Williams |
| 8,185,229 | B2 | 5/2012 | Davidson |
| 8,096,262 | B2 | 6/2012 | Ederer et al. |
| 8,191,500 | B2 | 6/2012 | Dohring et al. |
| 8,211,226 | B2 | 7/2012 | Bredt et al. |
| 8,232,444 | B2 | 7/2012 | Bar Nathan et al. |
| 8,259,103 | B2 | 9/2012 | Glueck et al. |
| 8,269,767 | B2 | 9/2012 | Glueck et al. |
| 8,282,866 | B2 | 10/2012 | Hiraide |
| 8,326,024 | B2 | 12/2012 | Shkolnik |
| 8,372,330 | B2 | 2/2013 | El-Siblani et al. |
| 8,394,313 | B2 | 3/2013 | El-Siblani et al. |
| 8,413,578 | B2 | 4/2013 | Doyle |
| 8,424,580 | B2 | 4/2013 | Anderson et al. |
| 8,444,903 | B2 | 5/2013 | Lyons et al. |
| 8,454,879 | B2 | 6/2013 | Kuzusako et al. |
| 8,475,946 | B1 | 7/2013 | Dion et al. |
| 8,506,862 | B2 | 8/2013 | Giller et al. |
| 8,506,870 | B2 | 8/2013 | Hochsmann et al. |
| 8,513,562 | B2 | 8/2013 | Bichsel |
| 8,522,159 | B2 | 8/2013 | Kurtenbach et al. |
| 8,540,501 | B2 | 9/2013 | Yasukochi |
| 8,568,646 | B2 | 10/2013 | Wang et al. |
| 8,568,649 | B1 | 10/2013 | Balistreri et al. |
| 8,593,083 | B2 | 11/2013 | Firhoj et al. |
| 8,616,872 | B2 | 12/2013 | Matsui et al. |
| 8,623,264 | B2 | 1/2014 | Rohner et al. |
| 8,636,494 | B2 | 1/2014 | Gothait et al. |
| 8,636,496 | B2 | 1/2014 | Das et al. |
| 8,658,076 | B2 | 2/2014 | El-Siblani |
| 8,663,568 | B2 | 3/2014 | Bar Nathan et al. |
| 8,666,142 | B2 | 3/2014 | Shkolnik et al. |
| 8,703,037 | B2 | 4/2014 | Hull et al. |
| 8,715,832 | B2 | 5/2014 | Ederer et al. |
| 8,718,522 | B2 | 5/2014 | Chillscyzn et al. |
| 8,737,862 | B2 | 5/2014 | Manico et al. |
| 8,741,194 | B1 | 6/2014 | Ederer et al. |
| 8,741,203 | B2 | 6/2014 | Liska et al. |
| 8,744,184 | B2 | 6/2014 | Ameline et al. |
| 8,761,918 | B2 | 6/2014 | Silverbrook |
| 8,801,418 | B2 | 8/2014 | El-Siblani et al. |
| 8,805,064 | B2 | 8/2014 | Ameline et al. |
| 8,815,143 | B2 | 8/2014 | John et al. |
| 8,844,133 | B2 | 8/2014 | Fuller |
| 8,845,316 | B2 | 9/2014 | Schillen et al. |
| 8,845,953 | B1 | 9/2014 | Balistreri et al. |
| 8,862,260 | B2 | 10/2014 | Shkolnik et al. |
| 8,872,024 | B2 | 10/2014 | Jamar et al. |
| 8,873,024 | B2 | 10/2014 | Jamar et al. |
| 8,876,513 | B2 | 11/2014 | Lim et al. |
| 8,877,115 | B2 | 11/2014 | Elsey |
| 8,888,480 | B2 | 11/2014 | Yoo et al. |
| 8,915,728 | B2 | 12/2014 | Mironets et al. |
| 8,926,304 | B1 | 1/2015 | Chen |
| 8,932,511 | B2 | 1/2015 | Napendensky |
| 8,968,625 | B2 | 3/2015 | Tan |
| 8,974,717 | B2 | 3/2015 | Maguire et al. |
| 8,991,211 | B1 | 3/2015 | Arlotti et al. |
| 8,992,816 | B2 | 3/2015 | Jonasson et al. |
| 8,998,601 | B2 | 4/2015 | Busato |
| 9,011,982 | B2 | 4/2015 | Muller et al. |
| 9,031,680 | B2 | 5/2015 | Napadensky |
| 9,063,376 | B2 | 6/2015 | Mizumura |
| 9,064,922 | B2 | 6/2015 | Nakajima et al. |
| 9,067,359 | B2 | 6/2015 | Rohner et al. |
| 9,067,360 | B2 | 6/2015 | Wehning et al. |
| 9,067,361 | B2 | 6/2015 | El-Siblani |
| 9,073,260 | B2 | 7/2015 | El-Siblani et al. |
| 9,079,357 | B2 | 7/2015 | Ebert et al. |
| 9,101,321 | B1 | 8/2015 | Kiesser |
| 9,149,986 | B2 | 10/2015 | Huang et al. |
| 9,150,032 | B2 | 10/2015 | Roof et al. |
| 9,153,052 | B2 | 10/2015 | Ameline et al. |
| 9,159,155 | B2 | 10/2015 | Andersen |
| 9,186,847 | B2 | 11/2015 | Fruth et al. |
| 9,193,112 | B2 | 11/2015 | Ohkusa et al. |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,221,100 | B2 | 12/2015 | Schwarze et al. |
| 9,233,504 | B2 | 1/2016 | Douglas et al. |
| 9,248,600 | B2 | 2/2016 | Goodman et al. |
| 9,259,880 | B2 | 2/2016 | Chen |
| 9,308,690 | B2 | 4/2016 | Boyer et al. |
| 9,327,385 | B2 | 5/2016 | Webb et al. |
| 9,346,217 | B2 | 5/2016 | Huang et al. |
| 9,346,218 | B2 | 5/2016 | Chen et al. |
| 9,360,757 | B2 | 6/2016 | DeSimone et al. |
| 9,364,848 | B2 | 6/2016 | Silverbrook |
| 9,403,322 | B2 | 8/2016 | Das et al. |
| 9,403,324 | B2 | 8/2016 | Ederer et al. |
| 9,415,443 | B2 | 8/2016 | Ljungblad et al. |
| 9,415,544 | B2 | 8/2016 | Kerekes et al. |
| 9,415,547 | B2 | 8/2016 | Chen et al. |
| 9,429,104 | B2 | 8/2016 | Fuller |
| 9,434,107 | B2 | 9/2016 | Zenere |
| 9,446,557 | B2 | 9/2016 | Zenere et al. |
| 9,453,142 | B2 | 9/2016 | Rolland et al. |
| 9,456,884 | B2 | 10/2016 | Uckelmann et al. |
| 9,457,374 | B2 | 10/2016 | Hibbs et al. |
| 9,463,488 | B2 | 10/2016 | Ederer et al. |
| 9,469,074 | B2 | 10/2016 | Ederer et al. |
| 9,486,944 | B2 | 11/2016 | El-Siblani et al. |
| 9,486,964 | B2 | 11/2016 | Joyce |
| 9,487,443 | B2 | 11/2016 | Watanabe |
| 9,498,920 | B2 | 11/2016 | DeSimone et al. |
| 9,498,921 | B2 | 11/2016 | Teulet |
| 9,511,546 | B2 | 12/2016 | Chen et al. |
| 9,517,591 | B2 | 12/2016 | Yoo et al. |
| 9,517,592 | B2 | 12/2016 | Yoo et al. |
| 9,527,244 | B2 | 12/2016 | El-Siblani |
| 9,527,272 | B2 | 12/2016 | Steele |
| 9,529,371 | B2 | 12/2016 | Nakamura |
| 9,533,450 | B2 | 1/2017 | El-Siblani et al. |

(56) References Cited

U.S. PATENT DOCUMENTS

| | | |
|---|---|---|
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 9/2005 | Ishikawa et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |

(56) References Cited

U.S. PATENT DOCUMENTS

| | | |
|---|---|---|
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0304369 A1 | 10/2018 | Myerberg et al. |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126536 A1* | 5/2019 | Thompson ............ B29C 64/264 |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frolmmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1* | 9/2020 | Dubelman ............ B33Y 30/00 |
| 2020/0307075 A1 | 10/2020 | Mattes et al. |
| 2020/0376775 A1 | 12/2020 | Das et al. |
| 2021/0023776 A1 | 1/2021 | Van Esbroeck et al. |
| 2021/0046695 A1 | 2/2021 | Thompson et al. |
| 2021/0156779 A1 | 5/2021 | Medalsy |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufactuiing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outpetform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

(56) References Cited

OTHER PUBLICATIONS

Doctor Blade with Micrometer Screw Gauge, The Tape Casting Warehouse, Inc., Morrisville PA, 6 Pages. Retrieved Mar. 23, 2021 from Webpage: https://www.drblade.com/.
Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.
Feng et al., Exposure Reciprocity Law in Photopolymerization of Multi-Functional Acrylates and Methacrylates, Macromolecular Chemistry and Physics, vol. 208, 2007, pp. 295-306.
Formlabs, An Introduction to Post-Curing SLA 3D Prints, 8 Pages. Retrieved from Webpage: https://formlabs.com/blog/introduction-post-curing-sla-3d-prints.
Formlabs, Form Wash & Form Cure, 8 Pages. Retrieved from Webpage: https://formlabs.com/tools/wash-cure/.
Hafkamp et al., a Feasibility Study on Process Monitoring and Control in Vat Photopolymerization of Ceramics, Mechatronics, vol. 56, the Netherlands, Dec. 2018, pp. 220-241. Retrieved from https://doi.org/10.1016/j.mechatronics.2018.02.006.
Kudo3D, Post-Process Your SLA Prints in 4 Easy Steps, 8 Pages. Retrieved from Webpage: https://www.kudo3d.com/post-process-your-sla-prints-in-4-easy-steps/.
Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.
Lee et al., Development of a 3D Printer Using Scanning Projection Stereolithography, Scientific Reports, vol. 5, Article No. 9875, 2015, 5 pages. https://www.nature.com/articles/srep09875#s1.
Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.
Limaye, Multi-Objective Process Planning Method for Mask Projection Stereolithography, Dissertation Georgia Institute of Technology, Dec. 2007, 324 Pages.
Lithoz, 2 Pages. Retrieved from Webpage: http://www.lithoz.com/en/our-products/cleaning-station.
Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.
Micron3D, Cleaning of Printed Models, YouTube, Dec. 5, 2016, 1 Page. Retrieved from Webpage: https://www.youtube.com/watch?v=soAIrSsliBY.
Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa Florida.
Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.
Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.
Prodways Tech, Prodways Movinglight Technology Retrieved on Jul. 2, 2020 from Web Link: https://www.prodways.com/en/the-prodways-movinglight-technology/.
Ramco Equipment Corporation, Ramco RamTough-Fully Automated Wash/Rinse/Dry System, YouTube, Jul. 9, 2013, 1 Page. Retrieved from Webpage: https://www.youtube.com/watch?v=j8S5Oc3FVFU.
Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.
Sonics & Materials, Inc., Ultrasonic Food Cutting Equipment, Sonics & Materials, Inc., Retrieved on Jun. 26, 2020, 4 Pages. http://www.sonics.com/food-cutting.
Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.
Stevenson, Admatec's Ceramic 3D Printers, Ceramic, Metal, Fabbaloo 3D Printing News, Jan. 21, 2019, 8 Pages. Retrieved Nov. 24, 2020 from Weblink: http://www.fabbaloo.com/blog/2019/1/21/admatecs-ceramic-3d-printers.
Techmetals, Electroless Nickel (TM 117C), Engineered Metal Finishing & Performance Coatings, 1 Page. Retrieved from Webpage: https://techmetals.com/pdf/TM_117C.pdf https://techmetals.com/tm117c-2/.
Telsonic Ultrasonics, Cutting Awning Fabrics and Sealing the Edge, the Powerhouse of Ultrasonics, 2017, 1 Page. https://www.telsonic.com/fileadmin/applications/AS_206_Cut_Seal_Markisengewebe_EN.pdf.
Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article.10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.

\* cited by examiner

CONTROL SYSTEMS AND METHODS FOR ADDITIVE MANUFACTURING

CROSS-REFERENCE TO RELATED APPLICATION

The present application claims priority to U.S. Provisional Patent Application Ser. No. 63/239,530, filed on Sep. 1, 2021, the contents of which of which are hereby incorporated by reference in their entirety.

FIELD

The present subject matter relates generally to additive manufacturing apparatuses, and more particularly to control systems and methods for various components of additive manufacturing apparatuses.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent resin support, such as a tape or foil, that is fed out from a supply reel to a build zone. Radiant energy is produced from a radiant energy device and directed through a window to cure the resin to a component that is supported by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed.

In some instances, it may be beneficial to implement an additive manufacturing apparatus that includes multiple print modules. In such instances, various components may be shared while others may be independently controlled. As such, a control system is needed for controlling the various components.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1A:
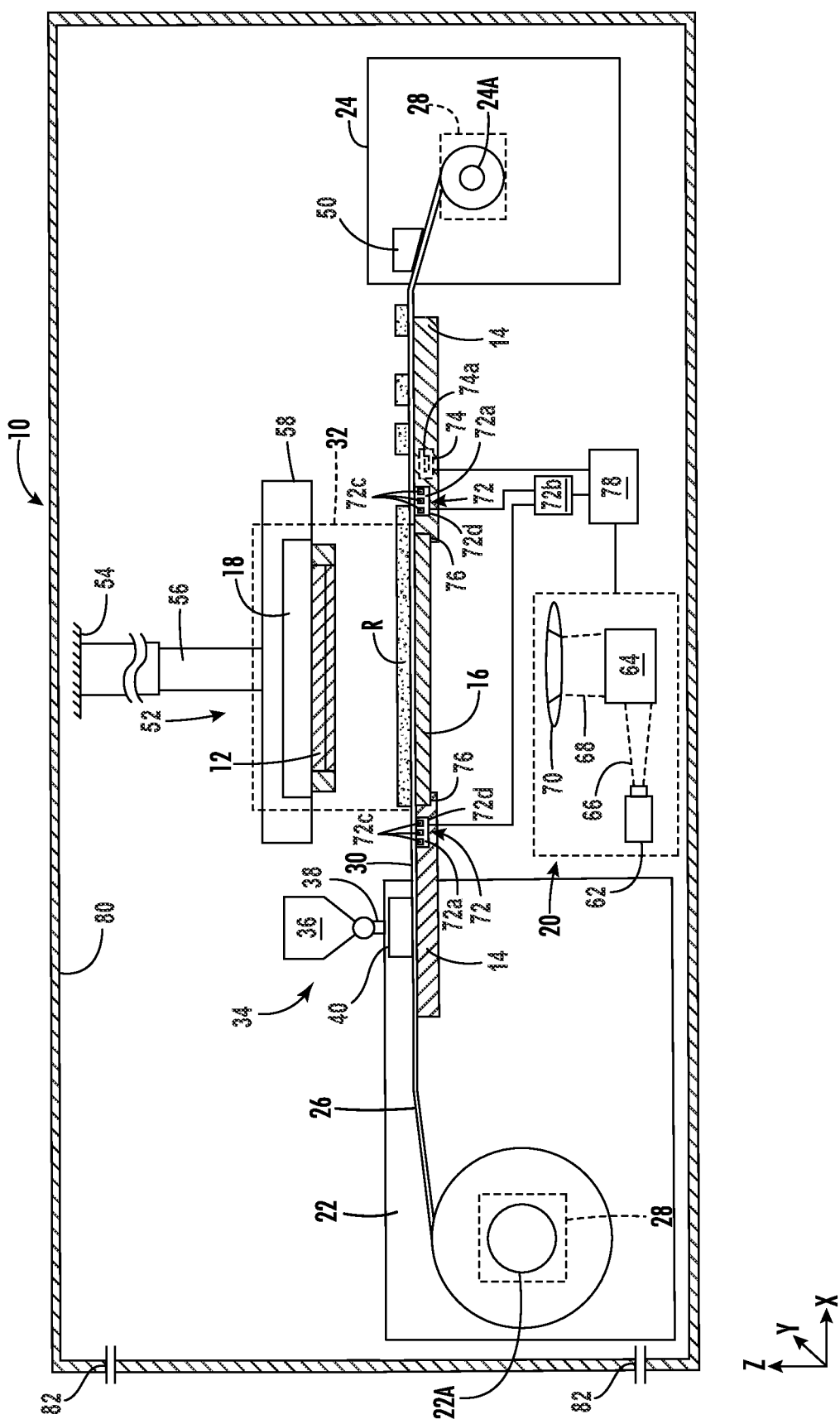
FIG. 1A is a schematic front view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves and "downstream" refers to the direction to which the resin support moves. The term "selectively" refers to a component's ability to operate in various states (e.g., an ON state and an OFF state) based on manual and/or automatic control of the component. As used herein, any two components that are "operably coupled" with one another may be capable of one-way two-way communication with one another. For example, a first component that is operably coupled with a second component may provide instructions to the second component from the first component and/or provide instructions to the first component from the second component. Additionally or alternatively, the first component may receive data from the second component, and/or the second component may receive data from the first component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a resin that is deposited as a layer having a desired thickness onto a resin support (such as a foil, tape, vat, plate, etc.) that is fed out from a supply reel. A stage lowers onto the resin such that a working surface defined by one of a surface of the stage or a surface of the work in process component is positioned such that the working surface either is just touching the resin or compressing it between the resin support and the stage and defining a layer thickness. Radiant energy is used to cure the resin through the resin support. Once the curing of the first layer is complete, the stage is retracted, taking the cured material with it. The resin support is then advanced to expose a fresh clean section, ready for additional resin to be deposited in a subsequent, new cycle.

In some instances, the additive manufacturing apparatus can include a first print module having a first stage configured to hold a first component and a first radiant energy device. The resin support is configured to be positioned between the first stage and the first radiant energy device. The additive manufacturing apparatus can also include a second print module having a second stage configured to hold a second component and a second radiant energy device. The resin support is configured to be positioned between the second stage and the second radiant energy device.

A control system is configured to translate the resin support through the first print module and the second print module. The control system is configured to handle the synchronization of the multiple printing modules and the various other components of the apparatus. The synchronization of the multiple printing modules may lead to increased output of the apparatus due to the utilization of shared ancillary processes across the multiple print modules.

Figure 1B:
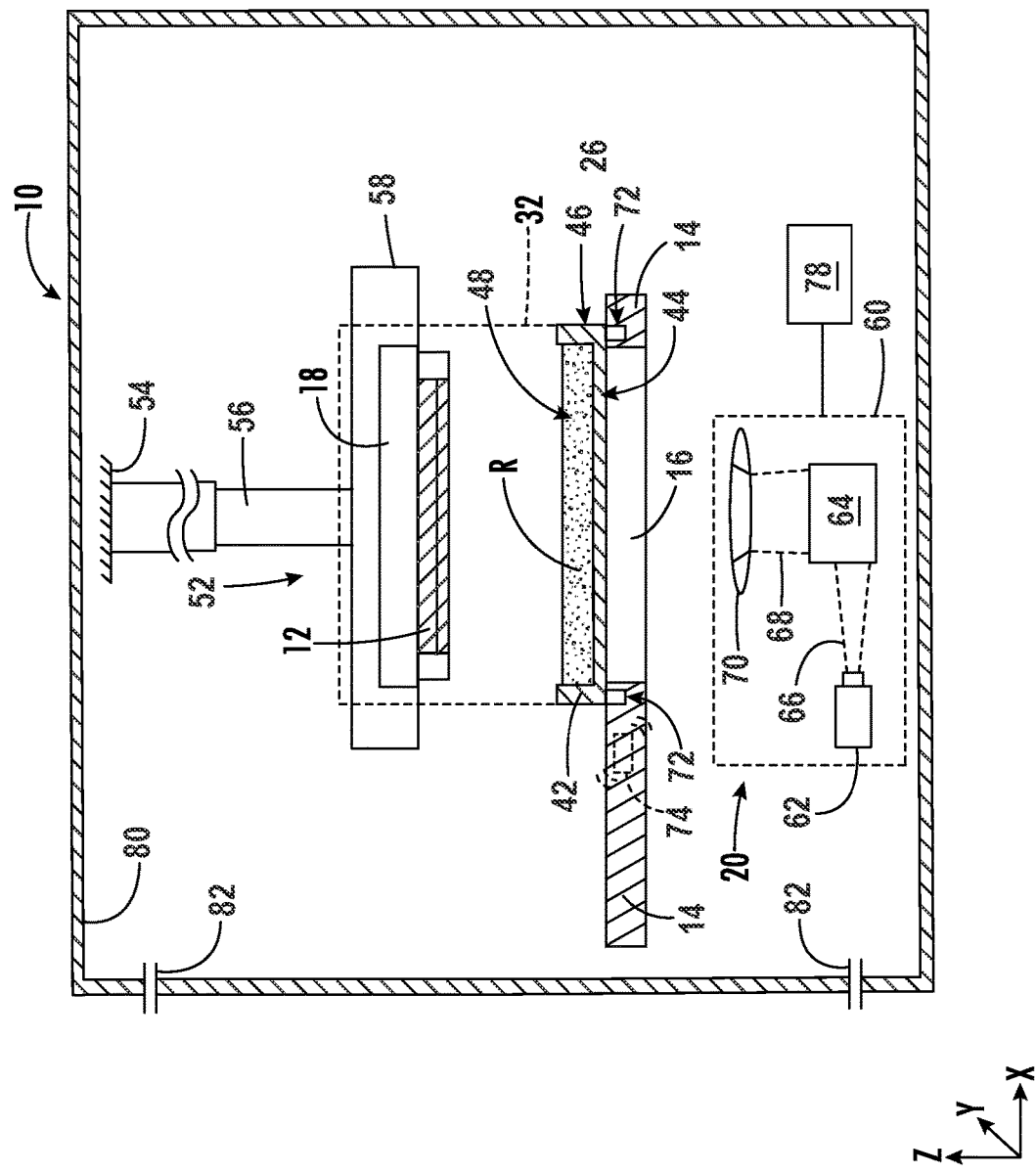
FIG. 1B is a schematic front view of an additive manufacturing apparatus in accordance with various aspects of the present disclosure.

Referring to the drawings wherein identical reference numerals denote the similar elements throughout the various views, FIGS. 1A and 1B schematically illustrate an example of one type of suitable apparatus 10 for forming a component 12. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example of FIG. 1A, the apparatus 10 includes a feed module 22, which may include a first mandrel 22A, and a take-up module 24, which may include a take-up mandrel 24A, that are spaced-apart with a resin support 26 extending therebetween. A portion of the resin support 26 can be supported from underneath by the support plate 14. Suitable mechanical supports (frames, brackets, etc.) and/or alignment devices may be provided for the mandrels 22A, 24A and the support plate 14. The first mandrel 22A and/or the take-up mandrel 24A can be configured to control the speed and direction of the resin support 26 such that the desired tension and speed is maintained in the resin support 26 through a drive system 28. By way of example and not limitation, the drive system 28 can be configured as individual motors associated with the first mandrel 22A and/or the take-up mandrel 24A. Moreover, various components, such as motors, actuators, feedback sensors, and/or controls can be provided for driving the mandrels 22A, 24A in such a manner to maintain the resin support 26 tensioned between the aligned mandrels 22A, 24A and to wind the resin support 26 from the first mandrel 22A to the take-up mandrel 24A.

In various embodiments, the window 16 is transparent and can be operably supported by the support plate 14. Further, the window 16 and the support plate 14 can be integrally formed such that one or more windows 16 are integrated within the support plate 14. Likewise, the resin support 26 is also transparent or includes transparent portions. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a "resin surface" 30, which is shown as being planar, but could alternatively be arcuate (depending on the shape of the support plate 14). In some instances, the resin surface 30 may be defined by the resin support 26 and be positioned to face the stage 18 with the window 16 on an opposing side of the resin support 26 from the stage 18. For purposes of convenient description, the resin surface 30 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 relative to the window 16.

The resin surface 30 may be configured to be "non-stick," that is, resistant to adhesion of a cured resin R. The non-stick properties may be embodied by a combination of variables such as the chemistry of the resin support 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 30 may incorporate a controlled roughness or surface texture (e.g. protrusions, dimples, grooves, ridges, etc.) with nonstick properties. Additionally or alternatively, the resin support 26 may be made in whole or in part from an oxygen-permeable material.

For reference purposes, an area or volume immediately surrounding the location of the resin support 26 and the window 16 or transparent portion defined by the support plate 14 may be defined as a "build zone," labeled 32.

In some instances, a deposition assembly 34 may be positioned along the resin support 26. In the illustrated embodiment, the material deposition assembly 34 includes a vessel 36 and a reservoir 40. A conduit 38 extends from the vessel 36 to direct resin from the vessel 36 to the reservoir 40. The conduit 38 may be positioned along a bottom portion of the vessel 36 such that the resin R may be gravity fed from the vessel 36 to the conduit 38, which may generally prevent the introduction of air to the resin R as the air is transferred into and/or through the conduit 38. In some instances, a filter may be positioned upstream, downstream, and/or within the conduit 38 with respect to the flow of resin from the vessel 36 to the reservoir 40. In such instances, the resin may be gravity fed through the filter prior to entering the reservoir 40 to catch various agglomerates, partially cured resin pieces, and/or other foreign objects that may affect the resin once it is thinned out on the resin support 26 or may affect the quality of the component 12.

The reservoir 40 may include any assembly to control the thickness of the resin R applied to the foil resin support 26, as the foil resin support 26 passes under and/or through the reservoir 40. The reservoir 40 may be configured to maintain a first amount volume of the resin R and define a thickness of the resin R on the foil resin support 26 as the foil resin support 26 is translated in an X-axis direction. The vessel 36 may be positioned above the reservoir 40 in a Z-axis direction, or in any other position, and configured to maintain a second amount volume of the resin R. In various embodiments, when the first amount volume of the resin R deviates from a predefined range, additional resin R is supplied from the vessel 36 to the reservoir 40.

In the illustrated example of FIG. 1B, the resin support 26 may be in the form of a vat 42 that is configured to isolate debris that could contaminate the build from usable resin R. The vat 42 may include a floor 44 and a perimeter wall 46. The perimeter wall 46 extends from the floor 44. Inner surfaces of the floor 44 and the perimeter wall 46 define a receptacle 48 for receiving the resin R.

A drive system may be provided for moving the vat 42 relative to the stage 18 parallel to the X-direction between a build zone 32 and a position at least partially external to the build zone 32. However, it will be appreciated that, in other embodiments, the resin support 26 may be stationary without departing from the scope of the present disclosure.

Referring back to FIGS. 1A and 1B, the resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity resin that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in viscosity as the resin R is heated.

The resin R may incorporate a filler. The filler may be pre-mixed with resin R, then loaded into the deposition assembly 34. Alternatively, the filler may be mixed with the resin R on the apparatus 10. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

In some embodiments, a reclamation system 50 may be configured to remove at least a portion of the resin R that remains on the foil resin support 26 after the foil resin support 26 is removed from a build zone 32. For example, the reclamation system 50 may include a collection structure, such as a wiper assembly, a blade assembly, and/or any other removal assembly.

With further reference to FIGS. 1A and 1B, the stage 18 is capable of being oriented parallel to the resin surface 30. Various devices may be provided for moving the stage 18 relative to the window 16 parallel to the Z-axis direction. For example, as illustrated in FIGS. 1A and 1B, the movement may be provided through an actuator assembly 52 that may be coupled with a static support 54. In some embodiments, the actuator assembly 52 may include a vertical actuator 56 between the stage 18 and the static support 54 that allows for movement of the stage 18 in a first, vertical direction (e.g., along the Z-axis direction). The actuator assembly 52 may additionally or alternatively include a lateral actuator 58 between the stage 18 and the vertical actuator 56 and/or the static support 54 that allows for movement in a second, horizontal direction (e.g., along the X-axis direction and/or the Y-axis direction). In some embodiments, the vertical actuator 56 may be operably coupled with the lateral actuator 58 such that the stage 18 and vertical actuator 56 move along the lateral actuator 58 simultaneously. The actuator assembly 52 may include any device practicable of moving the stage 18 in the first and/or second direction, such as ballscrew electric actuators, linear electric actuators, pneumatic cylinders, hydraulic cylinders, delta drives, belt systems, or any other practicable device.

The radiant energy device 20 may be configured as any device or combination of devices operable to generate and project radiant energy at the resin R in a suitable pattern and with a suitable energy level and other operating characteristics to cure the resin R during the build process. For example, as shown in FIGS. 1A and 1B, the radiant energy device 20 may include a projector 60, which may generally refer to any device operable to generate a radiant energy image of suitable energy level and other operating characteristics to cure the resin R. As used herein, the term "patterned image" refers to a projection of radiant energy including an array of one or more individual pixels. Non-limiting examples of patterned image devices include a DLP projector or another digital micromirror device, a two-dimensional array of LEDs, a two-dimensional array of lasers, and/or optically addressed light valves. In the illustrated example, the projector 60 includes a radiant energy source 62 such as a UV lamp, an image forming apparatus 64 operable to receive a source beam 66 from the radiant energy source 62 and generate a patterned image 68 to be projected onto the surface of the resin R, and optionally focusing optics 70, such as one or more lenses.

The image forming apparatus 64 may include one or more mirrors, prisms, and/or lenses and is provided with suitable actuators, and arranged so that the source beam 66 from the radiant energy source 62 can be transformed into a pixelated image 68 in an X-Y plane coincident with the surface of the resin R. In the illustrated example, the image forming apparatus 64 may be a digital micro-mirror device.

The projector 60 may incorporate additional components, such as actuators, mirrors, etc. configured to selectively move the image forming apparatus 64 or another part of the projector 60 with the effect of rastering or shifting the location of the patterned image 68 on the resin surface 30. Stated another way, the patterned image 68 may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 62 and a beam steering apparatus. The radiant energy source 62 may include any device operable to generate a beam of suitable power and other operating characteristics to cure the resin R. Non-limiting examples of suitable radiant energy sources 62 include lasers or electron beam guns.

In some instances, the apparatus 10 may include a material retention assembly 72 that may be configured to retain the resin support 26 in a predefined position along the support plate 14. In some instances, the material retention assembly 72 can include one or more pneumatic actuation zones 72a with each pneumatic actuation zone 72a configured to selectively interact with the resin support 26 by producing a force on a surface of the resin support 26 opposite the resin R.

The one or more pneumatic actuation zones 72a may apply a negative pressure on a first surface of the resin support 26 that is opposite to the resin R, or a second side of the resin support 26, to produce a suction or vacuum on the resin support 26. The negative pressure may retain the resin support 26 in a desired position long the support plate 14. The one or more pneumatic actuation zones 72a may also apply a positive pressure on the first surface of the resin support 26 that is opposite to the resin R, or a second side of the resin support 26, to produce a pushing force on the resin support 26. The positive pressure may release the resin support 26 from a module of the apparatus 10, such as the window 16, the material retention assembly 72, etc. As used herein, a "negative" pressure is any pressure that is less than an ambient pressure proximate to one or more pneumatic actuation zones 72a such that fluid may be drawn into the one or more pneumatic actuation zones 72a. Conversely, a "positive" pressure is any pressure that is greater than an ambient pressure proximate to one or more pneumatic actuation zones 72a such that fluid may be exhausted from the one or more pneumatic actuation zones 72a. Further, a "neutral" pressure is any pressure that is generally equal to an ambient pressure proximate to one or more pneumatic actuation zones 72a.

In some examples, the pneumatic actuation zones 72a may be fluidly coupled with a pneumatic assembly 72b through various hoses and one or more ports. The pneumatic assembly 72b may include any device capable of providing a vacuum/suction and/or pushing a fluid, such as air or a process gas (e.g., nitrogen or argon), through the one or more pneumatic actuation zones 72a. For instance, the pneumatic assembly 72b may include a pressurized fluid source that includes a compressor and/or a blower. The pneumatic assembly 72b may additionally or alternatively include any assembly capable of altering a pressure, such as a venturi vacuum pump. In some embodiments, one or more valves and/or switches may be coupled with the pneumatic assembly 72*b* and the one or more pneumatic actuation zones 72*a*. The one or more valves and/or switches are configured to regulate a pressure to each of the one or more pneumatic actuation zones 72*a*.

In some embodiments, the pneumatic actuation zone 72*a* includes one or more apertures 72*c* of any size and shape for interacting with the resin support 26. For instance, the apertures 72*c* may be any number and combination of holes, slits, or other geometric shapes defined by any module of the additive manufacturing apparatus 10, such as a portion of the support plate 14. Additionally, or alternatively, the apertures 72*c* may be defined by a portion of the support plate 14 being formed from a porous material, or through any other assembly in which a fluid may be moved from a first side of the support plate 14 to a second side of the support plate 14 to interact with the resin support 26.

In some examples, the pneumatic actuation zone 72*a* may be defined by a plenum 72*d*. The plenum 72*d* may be of any size and may be similar or varied from the shape of any remaining plenum 72*d*. In some instances, a gasket may be positioned about a rim of the plenum 72*d*. Additionally or alternatively, the material retention assembly 72 may include one or more clamps that compressively maintain the resin support 26 along the support plate 14.

With further reference to FIGS. 1A and 1B, a viscosity modification assembly 74 may be integrated within the support plate 14 and/or otherwise operably coupled with the resin support 26. The viscosity modification assembly 74 may be configured to apply a shearing stress to the resin R to alter (e.g., reduce) a viscosity of the resin R. Additionally or alternatively, the viscosity modification assembly 74 may be configured to heat the resin R to alter the viscosity of the resin R.

In some embodiments, the viscosity modification assembly 74 may be configured to mechanically vibrate one or more parts of the additive manufacturing apparatus 10 to create a shearing stress on the resin R. For example, the viscosity modification assembly 74 may include a movement device 74*a* (e.g., a transducer) that is operably coupled with the support plate 14. The movement device 74*a* may be configured to vibrate at least a portion of the support plate 14 or any other module of the apparatus 10 that is then transferred to the resin R. Additionally and/or alternatively, the movement device 74*a* may be configured to convert electrical energy to ultrasonic mechanical pressure waves that are transferred to the resin R. For instance, the movement device 74*a* may be in the form of an ultrasonic vibrating device, such as one utilizing a piezoelectric transducer. In other embodiments, the viscosity modification assembly 74, in addition to or in lieu of the transducer, may include, alone or in conjunction with one or the other, a fluid, an acoustic, a motor (e.g., offset cam), a reciprocating piston, or any other movement device 74*a*.

With further reference to FIGS. 1A and 1B, in various embodiments, in various embodiments, a gasket 76 may be positioned between the window 16 and the support plate 14 to isolate movement of each of the window 16 and the support plate 14 from one another. In various examples, the gasket 76 may be formed from a motion attenuating material, such as any of a wide variety of resilient elastomers including, but not limited to, materials containing natural rubber and silicone.

The apparatus 10 may include and/or be operably coupled with a computing system 78. The computing system 78 in FIGS. 1A and 1B is a generalized representation of the hardware and software that may be implemented to control the operation of the apparatus 10, including some or all of the stage 18, the drive system 28, the radiant energy device 20, the actuator assembly 52, the material retention assembly 72, the viscosity modification assembly 74, actuators, and the various parts of the apparatus 10 described herein. The computing system 78 may be embodied, for example, by software running on one or more processors embodied in one or more devices such as a programmable logic controller ("PLC") or a microcomputer. Such processors may be coupled to process sensors and operating modules, for example, through wired or wireless connections. The same processor or processors may be used to retrieve and analyze sensor data, for statistical analysis, and for feedback control. Numerous aspects of the apparatus 10 may be subject to closed-loop control.

Optionally, the modules of the apparatus 10 may be surrounded by a housing 80, which may be used to provide a shielding or inert gas (e.g., a "process gas") atmosphere using gas ports 82. Optionally, pressure within the housing 80 could be maintained at a desired level greater than or less than atmospheric. Optionally, the housing 80 could be temperature and/or humidity controlled. Optionally, ventilation of the housing 80 could be controlled based on factors such as a time interval, temperature, humidity, and/or chemical species concentration. In some embodiments, the housing 80 can be maintained at a pressure that is different than an atmospheric pressure.

Figure 2:
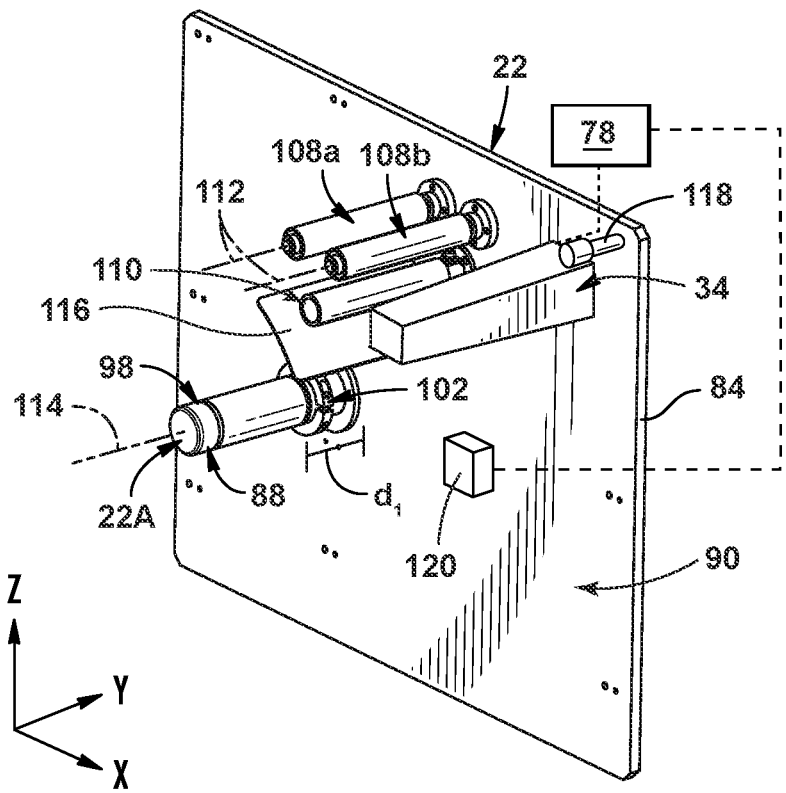
FIG. 2 is a front perspective view of a feed module in accordance with various aspects of the present disclosure.
Figure 3:
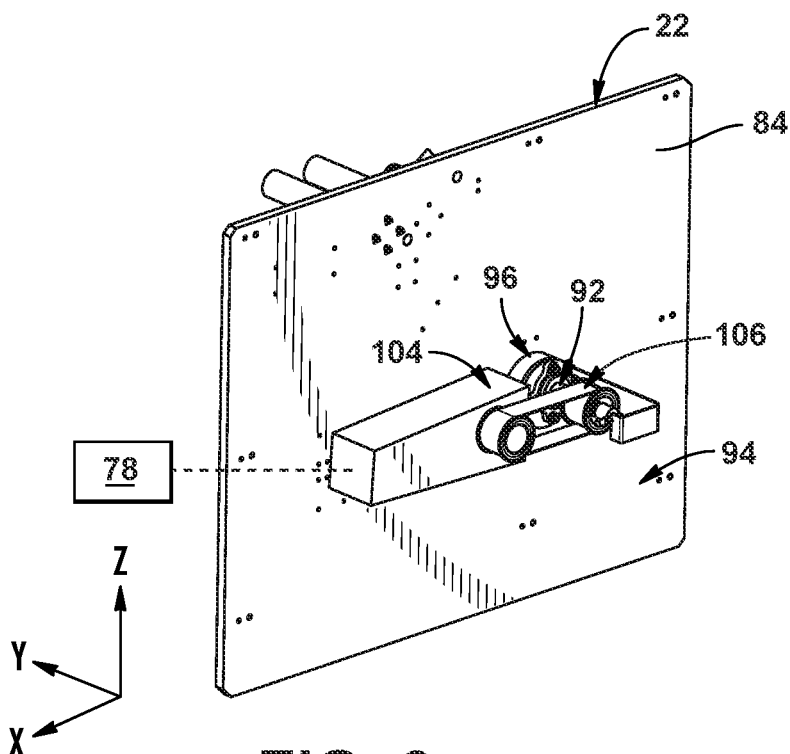
FIG. 3 is a rear perspective view of the feed module in accordance with various aspects of the present disclosure.
Figure 6:
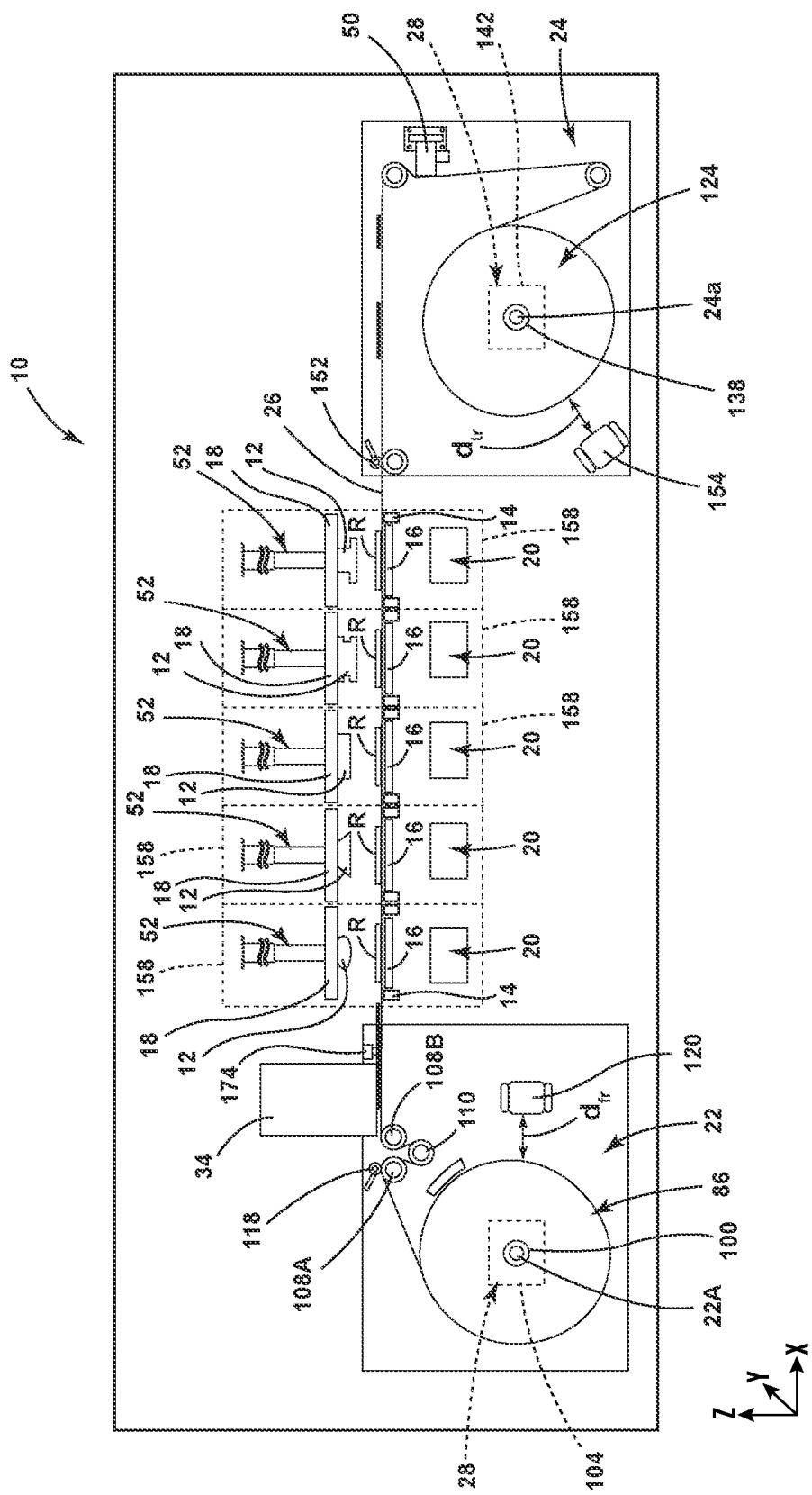
FIG. 6 is a schematic front view of an additive manufacturing apparatus in accordance with various aspects of the present disclosure.

Referring to FIGS. 2 and 3, exemplary perspective views of the feed module 22 including a first plate 84 are illustrated in accordance with exemplary embodiments of the present disclosure. As illustrated, the feed mandrel 22A can be anchored to the first plate 84 and may support and rotate a feed roll 86 (FIG. 6) of the resin support 26 (FIG. 6). In various embodiments, the feed mandrel 22A includes a front portion 88 on a first side 90 of the first plate 84 and a rear portion 92 on a second, opposing side 94 of the first plate 84. In some instances, a bearing 96 may be positioned along the front portion 88, the rear portion 92, and/or between the front and rear portions 88, 92.

The front portion 88 of the feed mandrel 22A may include a cylindrical portion 98 that is configured to accept the feed roll 86 of the resin support 26 thereabout. In various instances, the resin support 26 may be operably coupled to a first spool 100 (FIG. 6) (e.g., e.g., cardboard spool, polymeric spool, paper-based spool, metallic spool, composite spool, elastomeric spool, etc.), and the first spool 100 may be positioned about the feed mandrel 22A.

A stop 102 may be positioned between the cylindrical portion 98 and the first plate 84. As such, when the resin support 26 is wrapped about the feed mandrel 22A, the stop 102 defines a first distance $d_1$ between an inner edge of the resin support 26 and the first plate 84. In some examples, the feed mandrel 22A may be configured to move between a disengaged position and an engaged position. In operation, the feed mandrel 22A may be placed in the disengaged position to allow the first spool 100, and the resin support 26 wound thereabout, to be slid along the feed mandrel 22A to a position in which an end portion of the first spool 100 is in contact or close proximity to the stop 102. Once the first spool 100 is positioned about the feed mandrel 22A, the feed mandrel 22A may be placed in the engaged position causing the first spool 100, and, consequently, the feed roll 86 of the resin support 26 to rotate with the feed mandrel 22A.

In some embodiments, the drive system 28 (FIG. 1A) may include a feed actuation assembly 104 be operably coupled with the rear portion 92 of the feed mandrel 22A. The feed actuation assembly 104 may be configured as one or more motors, actuators, brakes (mechanical and/or electrical), or any other device that may rotate the feed mandrel 22A. Further, as illustrated in FIG. 3, the feed actuation assembly 104 may include a transmission 106 in the form of a belt system, a gear system, and/or any other practicable system.

With further reference to FIGS. 2 and 3, one or more rollers 108A, 108B, and/or a tension sensor 110, such as a load cell, may be anchored to the first side 90 of the first plate 84. For example, a pair of rollers 108A, 108B may be positioned above the feed mandrel 22A in the Z-axis direction. In some instances, the pair of rollers 108A, 108B may have an axis of rotation 112 that is generally parallel to an axis of rotation 114 of the feed mandrel 22A.

The tension sensor 110 may be positioned between the pair of rollers 108A, 108B and the feed mandrel 22A in the Z-axis direction. The tension sensor 110 may be configured as a force transducer that converts a tension or torque provided by the resin support 26 onto the load cell into an electrical signal that can be measured by the computing system 78 to determine a tension of the resin support 26. In some embodiments, the resin support 26 may be provided from the feed mandrel 22A around the first roller 108A, the tension sensor 110, and, subsequently, the second roller 108B.

As illustrated in FIG. 2, a cover 116 may be anchored to the first side 90 of the first plate 84. In various instances, the cover 116 may be configured to prevent any resin that might drip from dripping onto the feed roll 86 (FIG. 6) and/or any other module of the apparatus 10. Additionally or alternatively, the cover 116 may also prevent damage to various modules of the apparatus 10 while loading the feed roll 86 onto and/or off of the apparatus 10.

Referring still to FIGS. 2 and 3, in some embodiments, a first position sensor 118 may be operably coupled with the first plate 84 and configured to contact the resin support 26. The first position sensor 118, and/or any other sensor, may be capable of monitoring a movement (e.g., a linear distance) of the resin support 26 and may be positioned at any point within the feed module 22 or any other location upstream of the build stage 18. In several embodiments, the first position sensor 118 may be configured as a mechanical, optical, on-axis magnetic, and/or off-axis magnetic, may be an absolute encoder, an incremental encoder, and/or any other type of practicable encoder. Moreover, the first position sensor 118 may be any other type of practicable sensor without separating from the scope of the present disclosure.

The feed module 22 may further include a feed roll proximity sensor 120 that may be configured to detect a distance $d_{fr}$ (FIG. 6) between the feed roll proximity sensor 120 and the feed roll 86 of the resin support 26. As the resin support 26 is translated from the feed module 22 to the take-up module 24, the distance between the feed roll proximity sensor 120 and the feed roll 86 of the resin support 26 increases as a radius of the feed roll 86 is reduced. This change in distance may be provided to the computing system 78, which in turn, may be used to calculate a radius of the feed roll 86.

Figure 4:
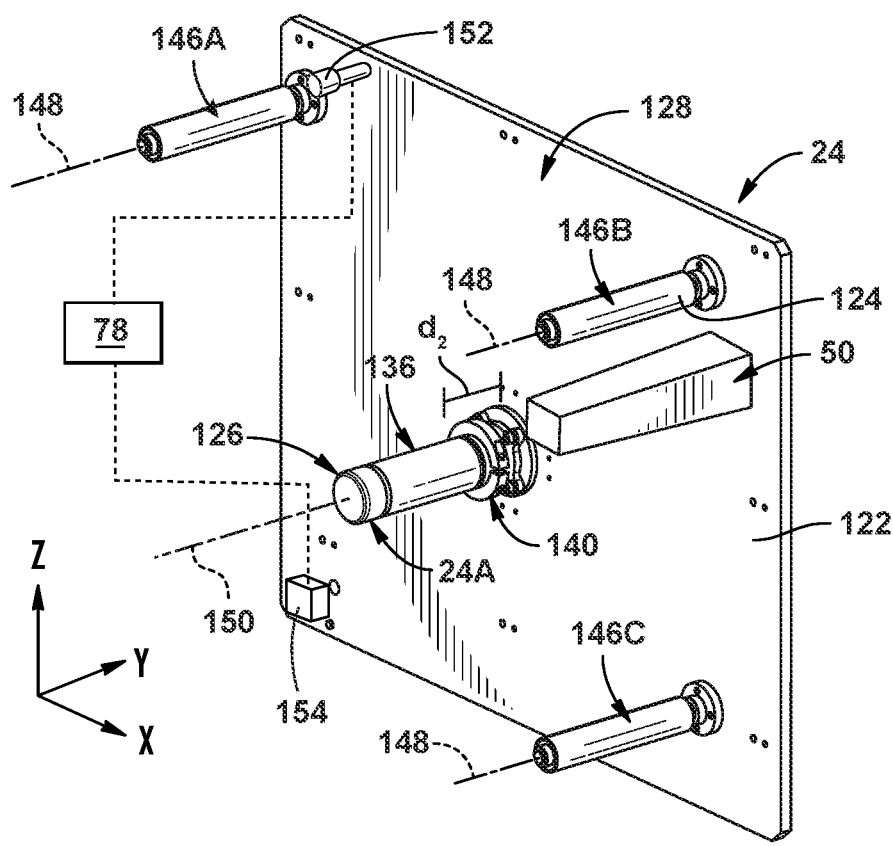
FIG. 4 is a front perspective view of a take-up module in accordance with various aspects of the present disclosure.
Figure 5:
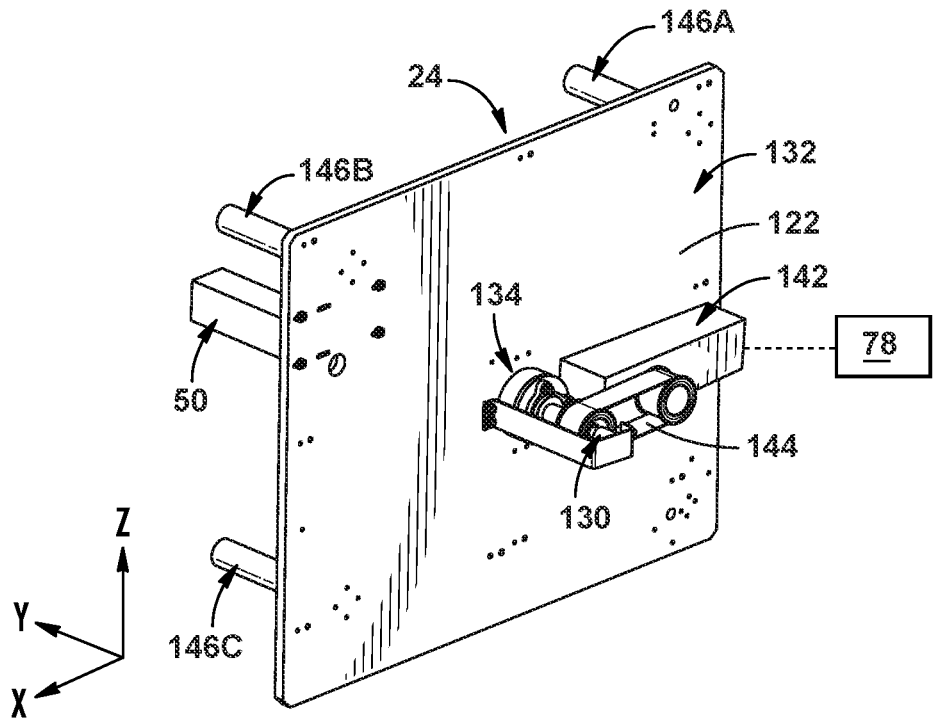
FIG. 5 is a rear perspective view of the take-up module in accordance with various aspects of the present disclosure.

Referring to FIGS. 4 and 5, respective front and rear perspective views of the take-up module 24 including a second plate 122 are illustrated in accordance with exemplary embodiments of the present disclosure. As illustrated, the take-up mandrel 24A may be anchored to the second plate 122 and configured to support a take-up roll 124 (FIG. 6) of the resin support 26.

In various embodiments, the take-up mandrel 24A includes a front portion 126 on a first side 128 of the second plate 122 and a rear portion 130 on a second, opposing side 132 of the second plate 122. In some instances, a bearing 134 may be positioned along the front portion 126, the rear portion 130, and/or between the first and second portions 126, 130 of the take-up mandrel 24A.

The front portion 126 of the take-up mandrel 24A may include a cylindrical portion 136 that is configured to accept the take-up roll 124 of the resin support 26 thereabout. In various instances, the resin support 26 may be operably coupled to a second spool 138 (FIG. 6) (e.g., cardboard spool, polymeric spool, paper-based spool, metallic spool, composite spool, elastomeric spool, etc.). The second spool 138 may be positioned about the take-up mandrel 24A.

A stop 140 may be positioned between the cylindrical portion 136 and the second plate 122. As such, the resin support 26 is wrapped about the take-up mandrel 24A, the stop 140 defines a second distance $d_2$ between the inner edge of the resin support 26 and the second plate 122. In some examples, the take-up mandrel 24A may be configured to move between a disengaged position and an engaged position. In operation, the take-up mandrel 24A may be placed in the disengaged position to allow the second spool 138 to be slid along the take-up mandrel 24A to a position in which an end portion of the second spool 138 is in contact or close proximity to the stop 140. Once the second spool 138 is positioned about the take-up mandrel 24A, the take-up mandrel 24A may be placed in the engaged position causing the second spool 138, and, consequently, the take-up roll 124 of the resin support 26 to rotate with the take-up mandrel 24A.

Similar to the feed module 22, a second actuation assembly 142 may be operably coupled with the rear portion 130 of the take-up mandrel 24A and extends from the second plate 122. The second actuation assembly 142 may be configured as one or more motors, actuators, or any other device that may rotate the take-up mandrel 24A. Further, as illustrated in FIG. 5, the second actuation assembly 142 may include a transmission 144 in the form of a belt system, a gear system, and/or any other practicable system. Moreover, the feed actuation assembly 104 and the second actuation assembly 142 may be operably coupled with feedback sensors and/or controls that can be provided for driving the mandrels 22A, 24A in such a manner so as to maintain the resin support 26 tensioned between the mandrels 22A, 24A and to wind the resin support 26 from the feed mandrel 22A to the take-up mandrel 24A.

With further reference to FIGS. 4 and 5, one or more rollers may be anchored to the first side 128 of the second plate 122. For example, a set of three rollers 146A, 146B, 146C may be positioned on various portions of the second plate 122. In some instances, each roller 146A, 146B, 146C may have an axis of rotation 148 that is generally parallel to an axis of rotation 150 of the take-up mandrel 24A.

The second plate 122 may further support the reclamation system 50, which may be configured to remove at least a portion of resin R that remains on the resin support 26 after the resin support 26 is removed from a build zone 32 (FIG. 1A). For example, the reclamation system 50 may include a wiper assembly, a blade assembly, and/or any other removal assembly for collecting the resin R that is removed from the resin support 26.

Referring still to FIGS. 4 and 5, in some embodiments, in addition to or instead of the first position sensor 118 upstream of the build stage 18 (FIG. 1A), the apparatus 10 (FIG. 1A) may include a second position sensor 152 downstream of the build stage 18. The second position sensor 152, and/or any other sensor, may be capable of monitoring a movement (e.g., a linear distance) of the resin support 26 and may be positioned at any point within the take-up module 24 or any other location downstream of the build stage 18. In various embodiments, the second position sensor 152 may be used for redundancy and verification of the drive system 28. Additionally or alternatively, the computing system 78 can compare the difference of motion between the first position sensor 118 and the second position sensor 152 to determine whether the drive system 28 is stretching/over tensioning the resin support 26.

The take-up module 24 may further include a take-up roll proximity sensor 154 that may be configured to detect a distance between the take-up roll proximity sensor 154 and the take-up roll 124 of the resin support 26. As the resin support 26 is translated from the feed module 22 to the take-up module 24, the distance between the take-up roll proximity sensor 154 and the take-up roll 124 of the resin support 26 decreases as a radius of the take-up roll 124 is increased. This change in distance may be provided to the computing system 78, which in turn, may be used to calculate a radius of the take-up roll 124.

Figure 7:
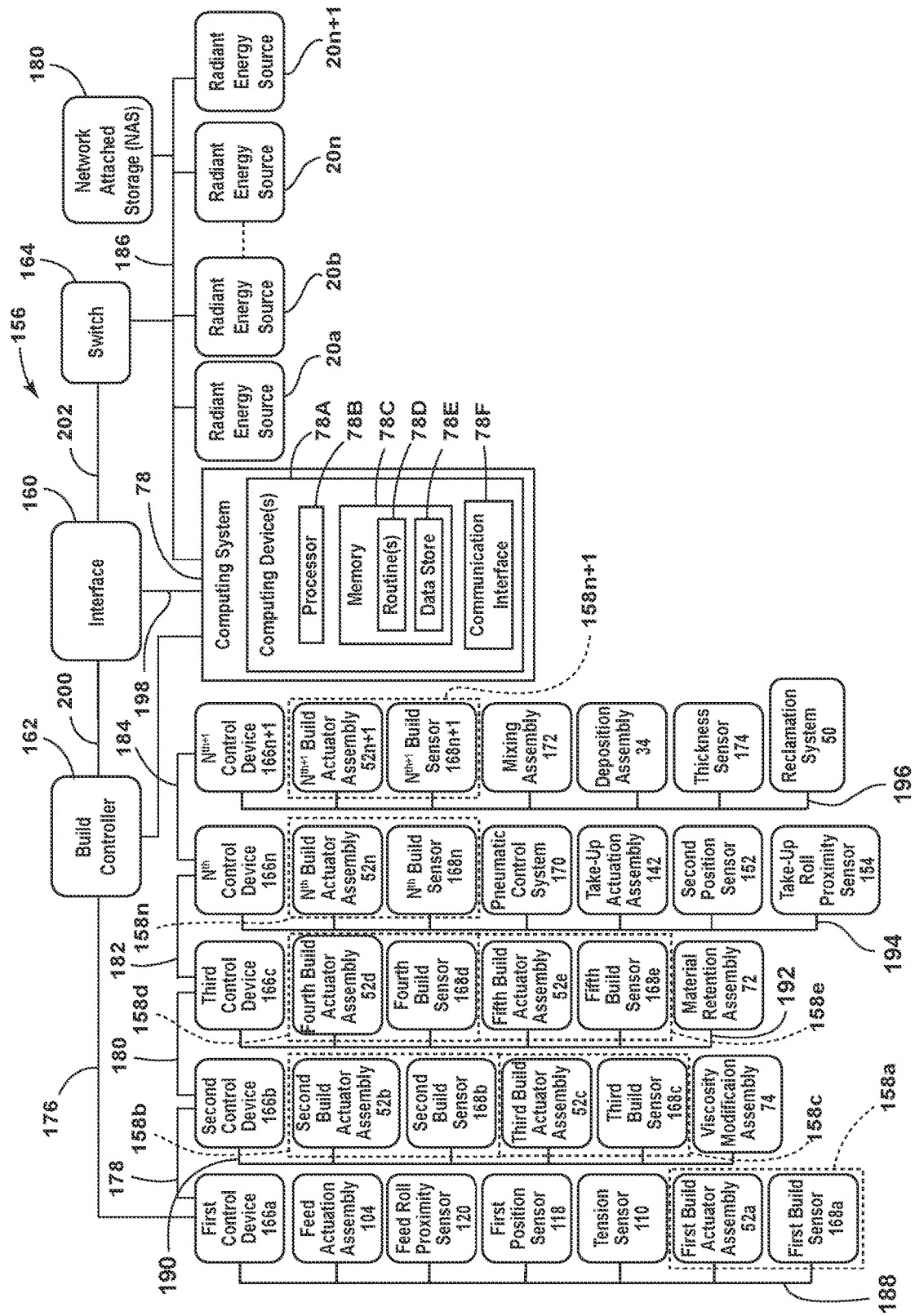
FIG. 7 depicts an exemplary control system for an additive manufacturing apparatus in accordance with various aspects of the present disclosure.

Referring now to FIGS. 6 and 7, a front schematic view of the additive manufacturing apparatus 10 and a block diagram of a control system 156 for the additive manufacturing apparatus 10 are respectively depicted according to example embodiments of the present disclosure. In various embodiments, the apparatus 10 may include one or more print modules 158. Each print module 158 may include a support plate 14, a window 16, a stage 18, an actuator assembly 52, and/or a radiant energy device 20. As such, each print module 158 may be configured to build a common or different component 12 from any of the other print modules 158. For example, a first component 12 may have a first geometry and a second component 12 may have a second geometry with the first geometry being different from the second geometry.

As generally illustrated in FIG. 6, the resin support 26 may be maintained in a position in which the resin support 26 generally extends through each print module 158 in an upstream/downstream orientation relative to the movement of the resin support 26 in the X-axis direction. In addition, the resin support 26 may be positioned between a window 16 and a stage of each respective print module 158. In the illustrated embodiment, each print module 158 includes unique parts (i.e., any device of any print module), however, it will be appreciated that in various embodiments, one or more parts of a first print module 158*a* may be shared with one or more other print modules 158*b*-158*n*+1. For example, a common window 16 may be shared by more than one print module 158.

With reference to FIGS. 6 and 7, the control system 156 is configured to control the synchronization of multiple printing modules and the various other assemblies of the apparatus 10. The synchronization of the multiple print modules 158 may lead to increased repeatability of component builds and increased output of the apparatus 10 due to the utilization of shared ancillary processes across the multiple print modules 158.

In some embodiments, the control system 156 is configured to monitor each print module 158 independently and to translate the resin support 26 based on a detected condition of one or more print modules 158. The conditions may include the initiation of a build process within a print module 158, restarting of a build process within a print module 158, failure of a build process within a print module 158, completion of a build process within a print module 158, and/or any other condition that the one or more print modules 158 may independently experience during a build process.

Further, the control system 156 is also configured to independently disable any of the print modules 158 when a stop operation condition is detected (e.g., when there is a failure within that respective print module 158, a component 12 with the respective print module 158 has been completed) while allowing for the other print modules 158 to continue a build process. In some instances, the control system 156 may also allow for print recovery if a failure is detected within one of the print modules 158. For example, the control system 156 may store the defined layer being printed and can reprint the layer to correct the failure and/or resume at any point in the build process by restarting the build process at the defined layer within the respective print module 158 while continuing the progression of each other component 12 within the remaining print modules 158.

In various embodiments, the control system 156 can provide a resin-coated resin support 26 (FIG. 1A) to each of the print modules 158 that are to be used during a current indexing of the resin support 26. As used herein, an "index" is a predefined length of movement of the resin support 26. For example, a first indexing of the resin support 26 may move the resin support 26 from the feed module 22 towards the take-up module 24 a first linear distance and a second indexing of the resin support 26 may subsequently move the resin support 26 from the feed module 22 towards the take-up module 24 a second linear distance. The first linear distance may be generally equal to, less than, or greater than the second linear distance based on the conditions detected within each print module 158. As provided herein, the control system 156 may build one or more components 12 within each print module 158.

As illustrated, the control system 156 may include a computing system 78. The computing system 78 can include one or more computing device(s) 78A. The computing device(s) 78A can include one or more processor(s) 78B and one or more memory device(s) 78C. The one or more processor(s) 78B can include any suitable processing device, such as a microprocessor, microcontroller, integrated circuit, an application-specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 78C can include one or more non-transitory computer-readable storage medium(s), such as RAM, ROM, EEPROM, EPROM, flash memory devices, magnetic disks, etc., and/or combinations thereof.

The memory device(s) 78C can include one or more computer-readable media and can store information accessible by the one or more processor(s) 78B, including routines 78D that can be executed by the one or more processor(s) 78B. The memory device(s) 78C can store the routines 78D for running one or more software applications, operating the drive system 28, displaying a user interface, receiving user input, processing user input, etc. In some implementations, the routines 78D can be executed by the one or more processor(s) 78B to cause the one or more processor(s) 78B to perform operations, e.g., such as one or more portions of methods described herein. The routines 78D can be software written in any suitable programming language or can be implemented in hardware. Additionally, and/or alternatively, the routines 78D can be executed in logically and/or virtually separate threads on processor(s) 78B.

The one or more memory device(s) 78C can also store data 78E that can be retrieved, manipulated, created, or stored by the one or more processor(s) 78B. The data 78E can include, for instance, data to facilitate performance of one or more routines, methods, procedures 200 (FIG. 9) and/or methods 300 (FIG. 10) described herein. In various embodiments, the one or more memory device(s) 78C may act as a central repository for each of the print modules 158 running contemporaneously during a build process thereby cutting down on storage costs and complexities of part versioning across multiple systems.

The data 78E can be stored in one or more database(s). The one or more database(s) can be connected to computing system 78 by a high bandwidth LAN or WAN or can also be connected to the computing system 78 through network(s). The one or more database(s) can be split up so that they are located in multiple locales. In some implementations, the data 78E can be received from another device.

The computing device(s) 78A can also include a communication module or interface 78F used to communicate with one or more other module(s) of computing system 78 or the additive manufacturing apparatus 10 over the network(s). The communication interface 78F can include any suitable modules for interfacing with one or more network(s), including, for example, transmitters, receivers, ports, controllers, antennas, or other suitable modules.

In the embodiment illustrated in FIGS. 6 and 7, a user interface 160 may be operably coupled with the computing system 78 through an interface communication bus 198. The user interface 160 may further be operably coupled with a build controller 162 through a build controller communication bus 197 and/or a network switch 164 through a switch communication bus 199. In some instances, the build controller 162 may be configured as a programmable logic controller that is responsible for controlling various aspects of the build. The build controller 162 can provide the user interface 160 and some storage. In various embodiments, the build controller 162 can communicate with each of the components described herein. In addition, the build controller 162 can utilize the build controller communication bus 197 and/or a network switch 164 to communicate with the radiant energy devices 20*a*-20*n*+1 (e.g., via embedded controllers).

In some instances, the user interface 160 may receive inputs related to a build process and/or provide information related to the build process to the operator. Additionally or alternatively, the user interface 160 may allow the operator to interact with the computing system 78, the build controller 162, and/or the radiant energy devices 20*a*-20*n*+1 to alter one or more settings or operations of each respective print module 158.

In some examples, the user interface 160 may include a display having a touchscreen. The display may be capable of displaying information related to the apparatus 10, the build process, the field, and/or any other information. In some embodiments, the user interface 160 may also include an input device in the form of circuitry within the touchscreen to receive an input corresponding with a location over the display. Other forms of input devices include one or more joysticks, digital input pads, or the like that can be used in place or in addition to the touchscreen.

With further reference to FIGS. 6 and 7, in various embodiments, the build controller 162 may be operably coupled with one or more control devices 166*a*-166*n*+1. As illustrated, each of the control devices 166*a*-166*n*+1 may be coupled in series to one another with a first control device 166*a* coupled with the build controller 162. However, it will be appreciated that any of the control devices 166*a*-166*n*+1 may additionally or alternatively be coupled with the build controller 162 in parallel.

In several embodiments, the build controller 162 may be configured as a master device in the form of any one of a variety of computing devices that may include a processor and memory. In addition, the build controller 162 may also include wireless communications and/or any wired communications protocols. For example, the control devices 166*a*-166*n*+1 are connected directly or indirectly via one or more communication lines 176, 178, 180, 182, 184 or an Input/Output (I/O) port that is included in each of the control devices 166*a*-166*n*+1. The control devices 166*a*-166*n*+1 may each include a power supply unit, a counter unit, a communication unit, an I/O unit, etc. The communication lines 176, 178, 180, 182 may take on various topologies such as a line, a daisy chain, a tree, and a start, and/or any other topology. In various embodiments, each of the control devices 166*a*-166*n*+1 may be operably coupled with various assemblies of the apparatus 10 through one or more I/O ports. In some instances, each control device 166*a*-166*n*+1 includes a defined number of I/O ports, which may define the maximum inputs within each control device 166*a*-166*n*+1.

In some instances, the build controller 162 and the control devices 166*a*-166*n*+1 may be configured as an EtherCAT (Ethernet for Control Automation Technology) network that may be used for swiftly updating data and performing a synchronization control among the apparatus. In such instances, the build controller 162 can use an Ethernet integrated element as a communication module, and the plurality of control devices 166*a*-166*n*+1 can use an EtherCAT ASIC (Application Specific Integrated Circuit) as a communication module. Further, the build controller 162 and the control devices 166*a*-166*n*+1 can use a distributed clock function for synchronizing operations of the control devices 166*a*-166*n*+1. The distributed clock function is realized by a synchronization signal of the EtherCAT ASIC, which is a communication module mounted at each control device 166*a*-166*n*+1.

In the illustrated embodiment, a first control device 166*a* may be operably coupled to the build controller 162 through a first communication line 176. The first control device 166*a* includes a first operation bus 188, which may be in the form of an I/O bus within the first control device 166*a*, that couples the first control device 166*a* to the feed actuation assembly 104, which is configured to drive the feed mandrel 22A. In various embodiments, the feed actuation assembly 104 may include an actuator assembly, which may be in the form of one or more of a stepper motor, a servo motor, and/or any other type of rotational actuator. The feed actuation assembly 104 may also include a feed controller that can provide the actuator with generated control signals, such as pulse-width modulated (PWM) signals or current control signals, to provide a predefined amount of torque on the feed mandrel 22A. In turn, the feed roll 86 of the resin support 26 coupled with the feed mandrel 22A may also have the amount of torque applied thereto. The feed controller may include control circuitry such as analog and/or digital control circuitry with logic for processing the various inputs and controlling the actuator as described herein. The feed controller may further include any combination of software and/or processing circuitry suitable for controlling the actuator. It will be appreciated that the feed controller may be integrated into the actuation assembly, the computing system 78, or otherwise coupled with the actuator.

As illustrated, in some examples, the feed roll proximity sensor 120 may be operably coupled with the first control device 166a through the first operation bus 188. The feed roll proximity sensor 120 may be capable of detecting a distance between the feed roll proximity sensor 120 and an outer circumference of the feed roll 86. In various examples, the feed roll proximity sensor 120 may be an ultrasonic sensor, a radio detection and ranging (RADAR) sensor, a sound navigation and ranging (SONAR) sensor, a light detection and ranging (LIDAR) sensor, a vision-based sensor, and/or any other type of practicable sensor.

In several embodiments, the first position sensor 118 of the feed module 22 may also be operably coupled with the first control device 166a through the first operation bus 188. In general, the first position sensor 118 can measure and determine a length of linear movement of the resin support 26. The first position sensor 118 can send information in the form of a series of pulse trains (or pulse waves) corresponding to the measured movement to the build controller 162, which interprets the pulse trains received to determine the length of linear movement of the resin support 26. Additionally or alternatively, the first position sensor 118 has a processing circuitry that is capable of determining a rotational speed of a contact portion of the first position sensor 118.

The tension sensor 110 may also be positioned within the feed module 22 and operably coupled with the first control device 166a through the first operation bus 188. The tension sensor 110 may be capable of determining a tension of the resin support 26 between the feed roll 86 and the take-up roll 124. The tension sensor 110 may be a force transducer that converts a tension or torque provided by the resin support 26 onto the tension sensor 110 into an electrical signal that can be measured by the computing system 78 to determine a tension of the resin support 26.

Further, a first print module 158a may be operably coupled with the first control device 166a through the first operation bus 188. The first print module 158a may include a first build actuator assembly 52a that allows for movement of the stage relative to the window 16. The first print module 158a may also include a first build sensor 168a, which may be capable of detecting movement of the stage such that the stage of the first print module 158a may be placed in defined positions by the first actuator assembly 52a.

With further reference to FIGS. 6 and 7, a second control device 166b may be operably coupled to the first control device 166a through a second communication line 178. The second control device 166b includes a second operation bus 190, which may be in the form of an I/O bus within the second control device 166b, that couples the second control device 166b with a second print module 158b. Like the first print module 158a, the second print module 158b may include a second build actuator assembly 52b that allows for movement of the stage relative to the window 16. The second print module 158b may also include a second build sensor 168b, which may be capable of detecting movement of the stage such that the stage of the second print module 158b may be placed in defined positions by the second actuator assembly 52b.

Likewise, a third print module 158c may also be operably coupled with the second control device 166b through the second operation bus 190. The third print module 158c may include a third build actuator assembly 52c that allows for movement of the stage relative to the window 16. The third print module 158c may also include a third build sensor 168c, which may be capable of detecting movement of the stage such that the stage of the third print module 158c may be placed in defined positions by the third actuator assembly 52c.

In addition, the viscosity modification assembly 74 may also be operably coupled with the second control device 166b through the second operation bus 190. As provided herein, the viscosity modification assembly 74 can be configured to apply a shearing stress to the resin R to alter (e.g., reduce) a viscosity of the resin R. Additionally or alternatively, the viscosity modification assembly 74 may be configured to heat the resin R to alter the viscosity of the resin R. It will be appreciated that each print module 158a-158n+1 may include a common or independent viscosity modification assembly 74. Additionally or alternatively, the viscosity modification assembly 74 may include various sections that may be independently operated such that each print module 158a-158n+1 is associated with a respective independently operable section of the viscosity modification assembly 74.

With further reference to FIGS. 6 and 7, a third control device 166c may be operably coupled to the second control device 166b through a third communication line 180. The third control device 166c includes a third operation bus 192, which may be in the form of an I/O bus within the third control device 166c, that couples the third control device 166c with a fourth print module 158d. The fourth print module 158d may include a fourth build actuator assembly 52d that allows for movement of the stage relative to the window 16. The fourth print module 158d may also include a fourth build sensor 168d, which may be capable of detecting movement of the stage such that the stage of the fourth print module 158d may be placed in defined positions by the fourth actuator assembly 52d.

Likewise, a fifth print module 158e may also be operably coupled with the third control device 166c through the third operation bus 192. The fifth print module 158e may include a fifth build actuator assembly 52e that allows for movement of the stage relative to the window 16. The fifth print module 158e may also include a fifth build sensor 168e, which may be capable of detecting movement of the stage such that the stage of the fifth print module 158e may be placed in defined positions by the fifth actuator assembly 52e.

In addition, the material retention assembly 72 may also be operably coupled with the third control device 166c through the third operation bus 192. As provided herein, the material retention assembly 72 may be configured to retain the resin support 26 in a predefined position along the support plate 14 of the one or more print modules 158. It will be appreciated that each print module 158a-158n+1 may include a common or independent material retention assembly 72. Additionally or alternatively, the material retention assembly 72 may include various sections that may be independently operated such that each print module 158a-158n+1 is associated with a respective independently operable section of the material retention assembly 72.

Referring still to FIGS. 6 and 7, a $n^{th}$ control device 166n may be operably coupled to the third control device 166n through a $n^{th}$ communication line 182. The $n^{th}$ control device 166n includes a $n^{th}$ operation bus 194, which may be in the form of an I/O bus within the $n^{th}$ control device 166n, that couples the $n^{th}$ control device 166n with an $n^{th}$ print module 158n. The $n^{th}$ print module 158n may include an $n^{th}$ build actuator assembly 52n that allows for movement of the stage relative to the window 16. The $n^{th}$ print module 158n may also include an $n^{th}$ build sensor 168n, which may be capable of detecting movement of the stage such that the stage of the $n^{th}$ print module 158$n$ may be placed in defined positions by the $n^{th}$ actuator assembly 52$n$.

A pneumatic control system 170 may also be operably coupled with the $n^{th}$ control device 166$n$ through the $n^{th}$ operation bus 194. The pneumatic control system 170 may be fluidly coupled with the material retention assembly 72 and/or any other module or assembly of the apparatus 10 through various hoses and one or more ports. The pneumatic control system 170 may include any device capable of providing a vacuum/suction and/or pushing a fluid, such as air or a process gas (e.g., nitrogen or argon), to the modules or assemblies of the apparatus 10. For instance, the pneumatic control system 170 may include a pressurized fluid source that includes a compressor and/or a blower. The pneumatic control system 170 may additionally or alternatively include any assembly capable of altering a pressure, such as a venturi vacuum pump. In some embodiments, one or more valves and/or switches may be coupled with the pneumatic control system 170. In such instances, the valves and/or switches may be operably coupled with the $n^{th}$ control device 166$n$ and the build controller 162 and/or the computing system 78.

With further reference to FIGS. 6 and 7, in addition to or instead of the first position sensor 118 upstream of one or more print modules 158, the apparatus 10 may include a second position sensor 152 downstream of one or more print modules 158. The second position sensor 152 may be operably coupled with the $n^{th}$ control device 166$n$ through the $n^{th}$ operation bus 194. The second position sensor 152, and/or any other sensor, may be capable of monitoring a movement (e.g., a linear distance) of the resin support 26 and may be positioned at any point within the take-up module 24 or any other location downstream of one or more print modules 158. The second position sensor 152 can send information in the form of a series of pulse trains (or pulse waves) corresponding to the measured movement to a computing system 78, which interprets the pulse trains received to determine the length of linear movement of the resin support 26. Alternatively, the second position sensor 152 has a processing circuitry that is capable of determining the rotational speed of a contact portion of the second position sensor 152.

The take-up module 24 may also include a take-up roll proximity sensor 154 operably coupled with the $n^{th}$ control device 166$n$ through the $n^{th}$ operation bus 194. The take-up roll proximity sensor 154 may be configured as any proximity sensor that is capable of detecting a distance between the take-up roll proximity sensor 154 and an outer circumference of the take-up roll 124. For example, like the feed roll proximity sensor 120, the take-up roll proximity sensor 154 may be configured as an ultrasonic sensor, a radio detection and ranging (RADAR) sensor, a sound navigation and ranging (SONAR) sensor, a light detection and ranging (LIDAR) sensor, a vision-based sensor, and/or any other type of practicable sensor.

In the illustrated embodiment, the $n^{th}$ control device 166$n$ may also be operably coupled with the take-up actuation assembly 142 that is configured to drive the take-up mandrel 24A through the $n^{th}$ operation bus 194. In various embodiments, the take-up actuation assembly 142 may include an actuator, which may be in the form of one or more of a stepper motor, a servo motor, and/or any other type of rotational actuator. The take-up actuation assembly 142 may also include a take-up controller that can provide the actuator with generated control signals, such as pulse-width modulated (PWM) signals or current control signals, to provide a predefined amount of torque on the take-up mandrel 24A, in turn, the take-up roll 86 of the resin support 26 coupled with the take-up mandrel 24A may also have the amount of torque applied thereto. The take-up controller may include control circuitry such as analog and/or digital control circuitry with logic for processing the various inputs and controlling the actuator as described herein. The take-up controller may further include any combination of software and/or processing circuitry suitable for controlling the actuator. It will be appreciated that the take-up controller may be integrated into the actuation assembly, the build controller 162, the computing system 78, or otherwise coupled with the actuator.

Referring still to FIGS. 6 and 7, an $n^{th+1}$ control device 166$n$+1 may be operably coupled to the $n^{th}$ control device 166$n$ through an $n^{th+1}$ communication line 184. The $h^{th+1}$ control device 166$n$+1 includes an $n^{th+1}$ operation bus 196, which may be in the form of an I/O bus within the $n^{th+1}$ control device 166$n$+1, that couples the $n^{th+1}$ control device 166$n$ with an $n^{th+1}$ print module 158$n$+1. The $n^{th+1}$ print module 158$n$+1 may include an $n^{th+1}$ build actuator assembly 52$n$+1 that allows for movement of the stage relative to the window 16. The $n^{th+1}$ print module 158$n$+1 may also include an $n^{th+1}$ build sensor 168$n$+1, which may be capable of detecting movement of the stage such that the stage of the $n^{th+1}$ print module 158$n$+1 may be placed in defined positions by the $n^{th+1}$ actuator assembly 52$n$+1.

A resin mixing assembly 172 may also be operably coupled with the $n^{th+1}$ control device 166$n$+1 through the $n^{th+1}$ operation bus 196. For example, the resin mixing assembly 172 may be configured to agitate the resin before the resin being deposited on the resin support 26. In some instances, a deposition assembly 34 may receive the resin from the resin mixing assembly 172. The deposition assembly 34 may also be operably coupled with the $n^{th+1}$ control device 166$n$+1. The resin deposition assembly 34 may be any device or combination of devices that is operable to apply a resin R on the resin support 26.

Further, a thickness sensor 174 may also be operably coupled with the $n^{th+1}$ control device 166$n$+1 through the $n^{th+1}$ operation bus 196. The thickness sensor 174 is configured to determine a thickness of resin deposited on the resin support 26. The thickness sensor 174 may be embodied as one or more confocals, imaging sensor, or any other vision-based device. The thickness sensor 174 may additionally and/or alternatively be configured as any other practicable proximity sensor, such as, but not limited to, an ultrasonic sensor, a radar sensor, a LIDAR sensor, or the like.

In some embodiments, a reclamation system 50 may also be operably coupled with the $n^{th+1}$ control device 166$n$+1 through the $n^{th+1}$ operation bus 196. The reclamation system 50 may be configured to remove at least a portion of the resin R that remains on the foil resin support 26 after the foil resin support 26 is removed from a build zone 32.

It will be appreciated that any of the modules, assemblies, etc. discussed herein may be operably coupled with any of the control devices 166 (e.g., first control device 166$a$, second control device 166$b$, third control device 166$c$, $n^{th}$ control device 166$n$, $n^{th+1}$ control device 166$n$+1) without departing from the teachings of the present disclosure. In addition, each of the modules, assemblies, etc. described herein may be independently coupled with any control device 166, directly to the build controller 162, and/or to the computing system 78 without departing from the scope of the present disclosure.

Still referring to FIGS. 6 and 7, in various embodiments, one or more radiant energy devices 20$a$-20$n$+1 may be coupled in parallel to the computing system 78 through an energy device communication bus 186. Each of the radiant energy devices 20a-20n+1 may be configured to generate a radiant energy patterned image of suitable energy level and other operating characteristics to cure the resin R. It will be appreciated that the patterned image emitted from each of the one or more radiant energy devices 20a-20n+1 may be different from one another, similar to one another, common with at least one of the remaining one or more radiant energy devices 20a-20n+1, and/or different from at least one of the remaining one or more radiant energy 20a-20n+1.

In some examples, a network switch 164 may operably couple the energy device communication bus 186 with the user interface 160. The network switch 164 may allow for various inputs for controlling or altering the performance of the one or more radiant energy devices 20a-20n+1 through the user interface 160. In addition, a network-attached storage (NAS) device 187 may be operably coupled with the energy device communication bus 186. The NAS device 187 includes a NAS controller and one or more storage devices. The NAS device 187 is configured to be in communication with a network, a local device, such as the computing system 78, and a peripheral device, such as the radiant energy devices 20a-20n+1.

The NAS controller can include a network interface for enabling connection with and transferring data to and from the network, and a local device interface that enables the transfer of data to and from the computing system 78. A storage device interface is configured to be in communication with the storage devices for obtaining status information of the storage devices and facilitating data transfer between the storage devices and the network and/or the computing system 78. A local peripheral interface enables the transfer of data to and from the network and/or the computing system 78 to the one or more radiant energy devices 20a-20n+1. A NAS processor oversees the overall operations of the NAS controller and coordinates functions between various modules of the NAS controller described above. A memory is provided to store the programs for enabling the NAS processor to perform its functions.

Figure 8:
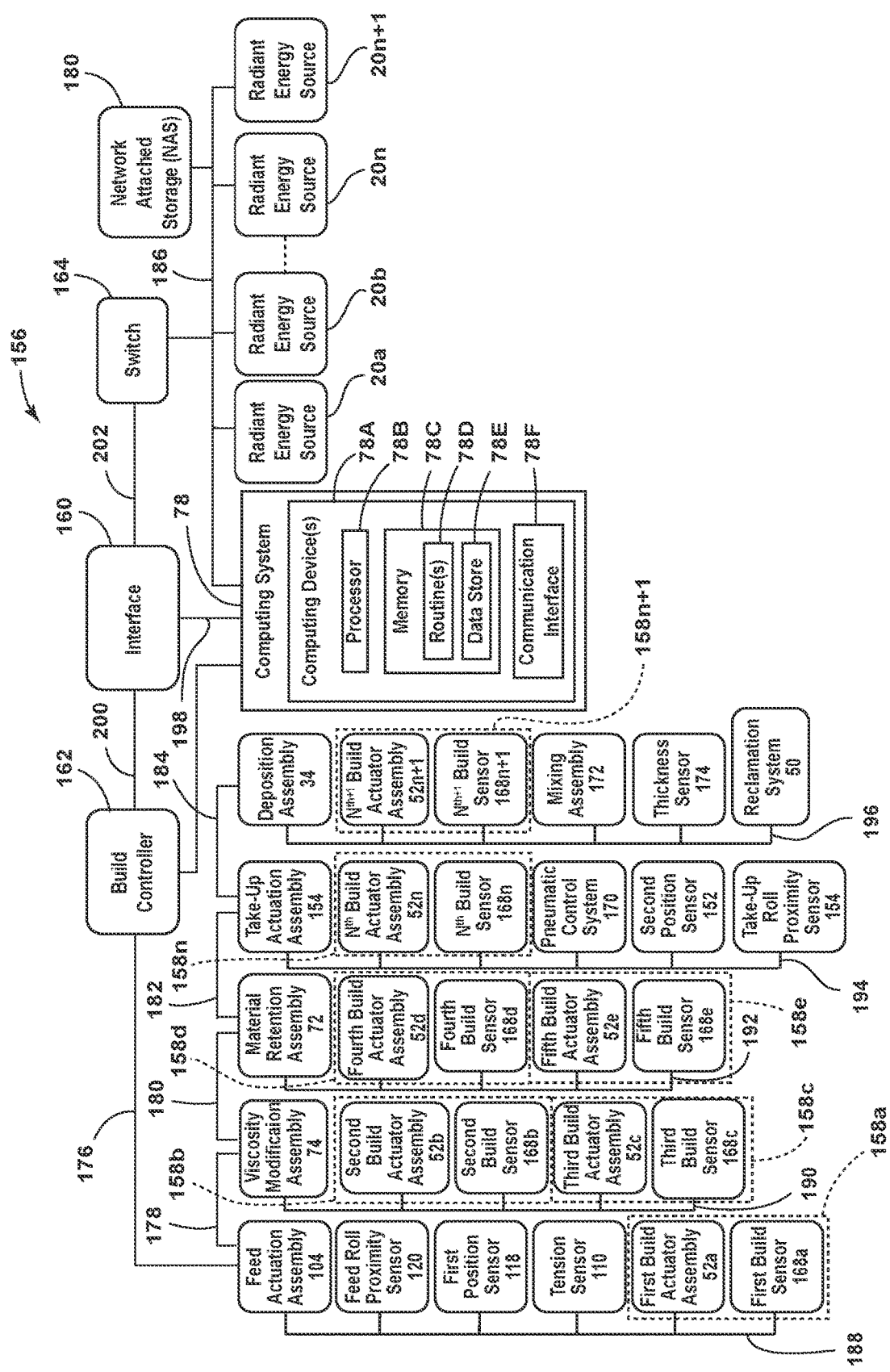
FIG. 8 depicts an exemplary control system for an additive manufacturing apparatus in accordance with various aspects of the present disclosure.

Referring now to FIG. 8, a block diagram of a control system 156 for the additive manufacturing apparatus 10 is depicted according to example embodiments of the present disclosure. It will be appreciated that each component illustrated in FIG. 8 may operate as described herein (for example, as described with reference to FIGS. 6 and 7).

With further reference to FIG. 8, in some embodiments, a part of the apparatus 10 may be operably coupled with the build controller 162 through a communication line 176. For example, as illustrated the build controller 162 may be operably coupled with the feed actuation assembly 104. The feed actuation assembly 104 may include a feed controller that can provide an actuator therein with generated control signals, such as pulse-width modulated (PWM) signals or current control signals, to provide a predefined amount of torque on the feed mandrel 22A. The feed controller may include control circuitry such as analog and/or digital control circuitry with logic for processing the various inputs and controlling the actuator as described herein. The feed controller may further include any combination of software and/or processing circuitry suitable for controlling the actuator. In addition, the feed actuation assembly 104 may include the first operation bus 188, which may be in the form of an I/O bus, that couples the feed actuation assembly 104 to one or more additional parts of the apparatus 10. For example, the first operation bus 188 may be operably coupled with the feed roll proximity sensor 120, the first position sensor 118, the tension sensor 110, and/or the first print module 158a.

In the example illustrated in FIG. 8, the viscosity modification assembly 74 may be operably coupled to the feed actuation assembly 104 through a communication line 178. The communication line 178 may be operably coupled with the first operation bus 188 and/or any other I/O port of the feed actuation assembly 104. In some instances, the viscosity modification assembly 74 may include a controller having control circuitry such as analog and/or digital control circuitry with logic for processing the various inputs and controlling the viscosity modification assembly 74 as described herein. The controller may further include any combination of software and/or processing circuitry suitable for controlling the viscosity modification assembly 74. In addition, the viscosity modification assembly 74 may include the second operation bus 190, which may be in the form of an I/O bus, which couples the viscosity modification assembly 74 to one or more additional parts of the apparatus 10. For example, the second operation bus 190 may be operably coupled with the second print module 158b and/or the third print module 158c.

In the example illustrated in FIG. 8, the material retention assembly 72 may be operably coupled to the viscosity modification assembly 74 through a communication line 180. The communication line 180 may be operably coupled with the second operation bus 190 and/or any other I/O port of the viscosity modification assembly 74. In some instances, the material retention assembly 72 may include a controller having control circuitry such as analog and/or digital control circuitry with logic for processing the various inputs and controlling the material retention assembly 72 as described herein. The controller may further include any combination of software and/or processing circuitry suitable for controlling the material retention assembly 72. In addition, the material retention assembly 72 may include the third operation bus 192, which may be in the form of an I/O bus, which couples the material retention assembly 72 to one or more additional parts of the apparatus 10. For example, the third operation bus 192 may be operably coupled with the fourth print module 158d and/or the fifth print module 158e.

Further, in the example illustrated in FIG. 8, the take-up actuation assembly 142 may be operably coupled to the material retention assembly 72 through a communication line 182. The communication line 182 may be operably coupled with the third operation bus 192 and/or any other I/O port of the material retention assembly 72. In some instances, the take-up actuation assembly 142 may include a controller having control circuitry such as analog and/or digital control circuitry with logic for processing the various inputs and controlling the take-up actuation assembly 142 as described herein. The controller may further include any combination of software and/or processing circuitry suitable for controlling the take-up actuation assembly 142. In addition, the take-up actuation assembly 142 may include the fourth operation bus 194, which may be in the form of an I/O bus, that couples the take-up actuation assembly 142 to one or more additional parts of the apparatus 10. For example, the fourth operation bus 194 may be operably coupled with the nth print module 158n, the pneumatic control system 170, the second position sensor 152, and/or the take-up roll proximity sensor 154.

Still further, in the example illustrated in FIG. 8, the deposition assembly 34 may be operably coupled to the take-up actuation assembly 142 through a communication line 184. The communication line 184 may be operably coupled with the fourth operation bus 194 and/or any other I/O port of the take-up actuation assembly 142. In some instances, the deposition assembly 34 may include a controller having control circuitry such as analog and/or digital control circuitry with logic for processing the various inputs and controlling the deposition assembly 34 as described herein. The controller may further include any combination of software and/or processing circuitry suitable for controlling the deposition assembly 34. In addition, the deposition assembly 34 may include the $n^{th+1}$ operation bus 196, which may be in the form of an I/O bus, that couples the deposition assembly 34 to one or more additional parts of the apparatus 10. For example, the $n^{th+1}$ operation bus 196 may be operably coupled with the $n^{th+1}$ print module 158$n$+1, the mixing assembly 172, the thickness sensor 174, and/or the reclamation system 50.

It will be appreciated that any first part described herein may include a controller that is operably coupled with the build controller 162. In addition, any additional part may be coupled with the first part in parallel and/or in series without departing from the scope of the present disclosure. As such, the illustrated topology is an example control system 156 for the apparatus 10 and is not limiting in any fashion. In addition, any part may be positioned within any branch of the topology without departing from the scope of the present disclosure. As used herein, a part of the apparatus may include any assembly, module, sensor, actuator, or another element that is within the apparatus 10.

Figure 9:
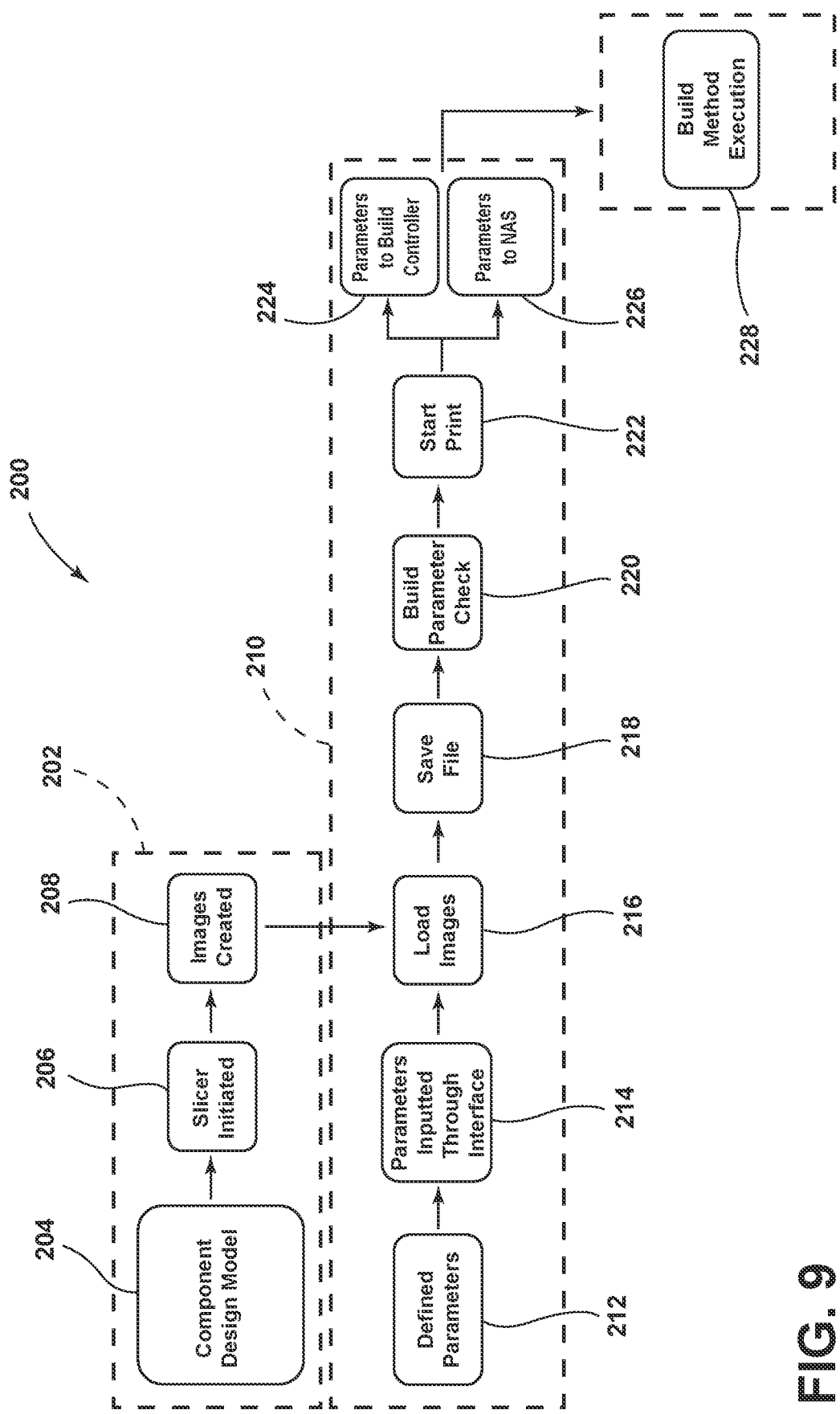
FIG. 9 is a method of operating the manufacturing apparatus in accordance with various aspects of the present disclosure.
Figure 10:
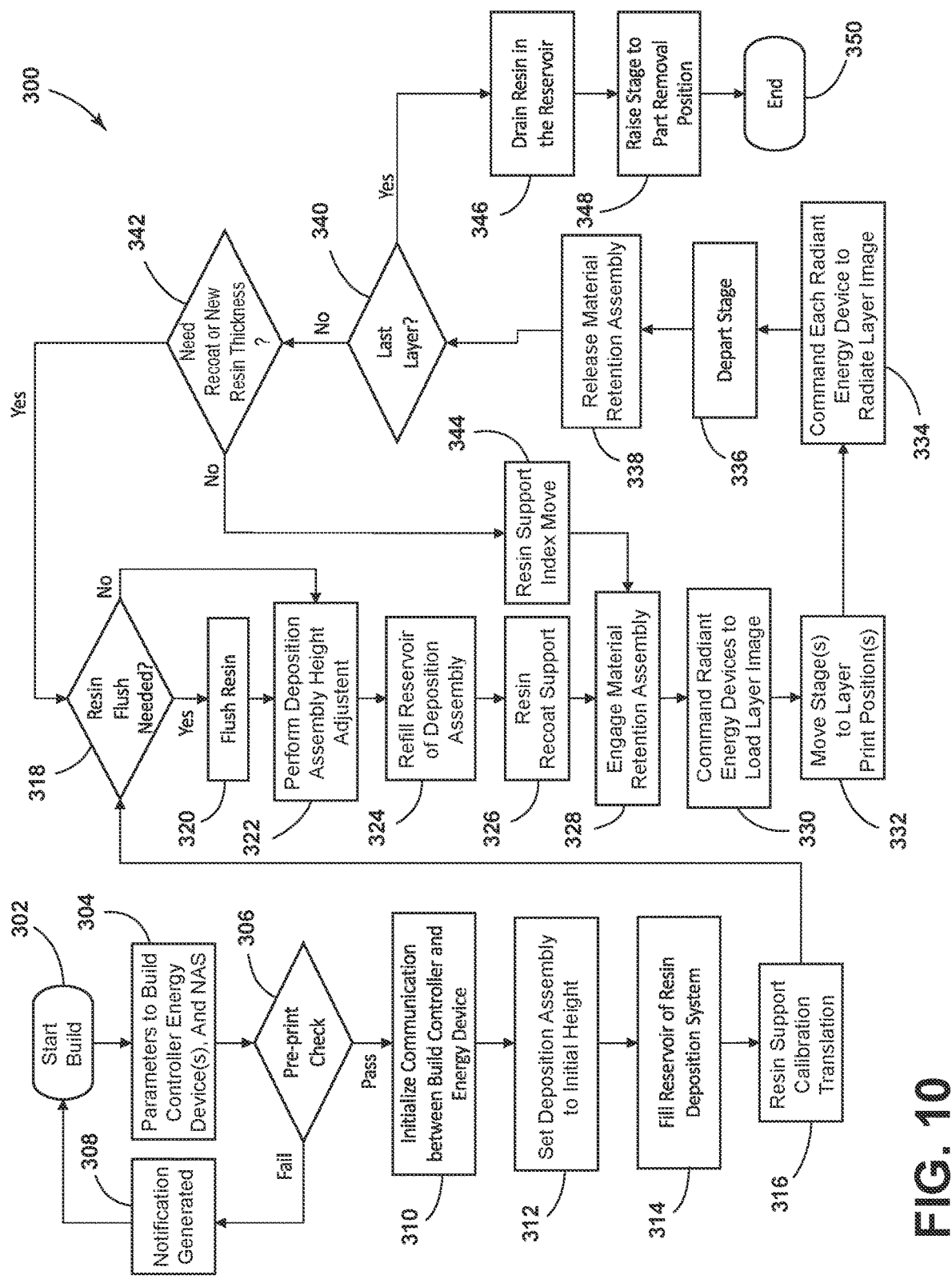
FIG. 10 is a method of operating the manufacturing apparatus in accordance with various aspects of the present disclosure.

Now that the construction and configuration of the additive manufacturing apparatus have been described according to various examples of the present subject matter, a procedure 200 for operating an additive manufacturing apparatus is provided in FIG. 9 and a method 300 of a build process of an additive manufacturing apparatus is provided in FIG. 10. The procedure 200 and/or the method 300 can be used to operate the additive manufacturing apparatus having any of the features described with reference to FIGS. 1A-8. It should be appreciated that the example procedure 200 and/or the example method 300 are discussed herein only to describe example aspects of the present subject matter, and are not intended to be limiting. Moreover, the steps set forth in the example procedure 200 and/or the example method 300 may be performed in any sequence without departing from the scope of the present disclosure.

Referring to FIG. 9, in operation, various portions of a build products may be completed remotely and/or within the apparatus while other portions of the build procedure may be completed by the apparatus. For instance, the procedure 200 may include a remote process 202 having one or more steps that may be completed by a device remote from the additive manufacturing apparatus and/or an online process 210 having one or more steps that may be completed by the components of the additive manufacturing apparatus.

In the illustrated example, a process 202 of defining one or more components to be built within the one or more print modules may be completed remotely. For instance, a three-dimensional design model of the component may be defined before manufacturing at step 204. In this regard, a model or prototype of the component may be scanned to determine the three-dimensional information of the component. As another example, a model of the component may be constructed using a suitable computer-aided design (CAD) program to define the three-dimensional design model of the component. The design model may include 3D numeric coordinates of the configuration of the component including both external and internal surfaces of the component. For example, the design model may define the body, the surface, and/or internal passageways such as openings, support structures, etc. In some exemplary embodiments, the three-dimensional design model is converted into a plurality of slices or segments at step 206, e.g., along a central (e.g., vertical) axis of the component or any other suitable axis. Each slice may define a thin cross section of the component for a height of the slice. At 208, the plurality of successive cross-sectional slices is stored as images that together form the 3D component.

An online process 210 may include defining the parameters of the build process. For example, at step 212, the parameters of the build process may be defined. At step 214, the parameters may be inputted through the user interface to the computing system. At step 216, the computing system may also receive the images of the component. Based on the parameters and the inputted parameters, at step 218, a build file for each component to be built may be created and stored within the apparatus and/or any other location that is accessible by the control device of the apparatus. In some instances, at step 220, a build parameter check may be performed to verify whether the parameter sets of each build module is compatible with the apparatus.

Once the file is saved, at step 222, the print process may be initiated. In such instances, the parameters related to one or more devices operably coupled with the build controller are directed thereto at step 224. From the build controller, shared parameters of a print configuration (resin support speed, slurry thickness, etc.) may be directed to the shared components of the apparatus. In addition, different print configurations can be sent to each print module. At step 226, the parameters related to the radiant energy sources, such as the images to be radiated by each of the radiant energy devices may be directed to the NAS device. Once each system receives the appropriate information, the build process is executed at step 228.

In various embodiments, the computing system is configured to provide instructions to each of the components within the apparatus to build one or more predefined components during the build process. For instance, the computing system may provide instructions to at least one of the first actuation assembly or the second actuation assembly of the drive system. For example, in some instances, the first actuation assembly can receive instructions to control the feed mandrel to obtain a target tension on the resin support and the second actuation assembly can receive instructions to control at least one of a velocity, distance, or acceleration of a movement of the resin support from the feed module to the take-up module. In various embodiments, the first actuation assembly and the second actuation assembly can operate independently from each other. The drive system may receive a plurality of inputs from one or more feed module sensors, such as the first position sensor, the tension sensor, the feed roll proximity sensor. Additionally or alternatively, the plurality of inputs may be provided by one or more take-up module sensors, such as the second position sensor, the take-up roll proximity sensor, or any other sensor of the apparatus.

A target length is received by the computing system, which may be a user-inputted value and/or generated by the computing system. The target distance may be based on various factors, such as the dimensions of the component to be formed, the dimensions of each stage, the number of print modules within the apparatus, the number of print modules being used for a print process, the number of radiant energy devices within the apparatus, the number of radiant energy devices being used for a print process, the size of each window within each print module of the apparatus, the size of each window within each print module being used for a print process, the size of the layer of the component to be formed within each print module, the thickness of the layer of the component that was just formed, the distance between each print module of the apparatus, the distance between each print module being used for a print process, etc. The target length of linear movement may be the same and/or altered for each successive layer of the component during the build process. As the first and second actuation assemblies are operated such that the resin support moves a target distance (or within a target distance range) at a target tension (or within a target tension range) by the control system, the first controller, and/or the second controller using one or more suitable timing algorithms to intermittently and/or constantly update the torque command through a control loop.

While the resin support is translated, the deposition assembly can receive resin from the resin mixing assembly that is then deposited on the resin support. The resin is then translated into the one or more print modules.

Once the resin is positioned within the one or more print modules, the stage of each print module that is used for a defined layer may be moved towards the resin. Once the stage is in a defined location, as determined by the build sensor of each respective print module, a corresponding radiant energy device of the print module may emit a defined image to at least partially cure a portion of the resin thereby forming a new layer of the component. Once each image is radiated from a respective radiant energy device, the corresponding stage is translated to a position further from the resin support, and the resin support is translated to deliver additional portions of resin to each defined print module.

In various embodiments, the translational distance of the resin support may be varied from one layer to the next. For instance, the control system may determine a failure has occurred within one of the print modules. When the control system determines a failure has occurred within one of the print modules, the print module may pause the build process for that component while the remaining components of the other print modules continue to be built. Similarly, if the control system determines that one of the components has finished being built while others have not, the print module may stop actuation of the stage for that component while the remaining components of the other print modules continue to be built. Likewise, the control system may determine that a print module is not in use for the build process. Based on the variances in operation between the various print modules, the control system may vary the translational length of the resin support for each layer of the component 12.

Referring now to FIG. 10, the method 300 or build process, at step 302, includes starting a build. The build process may be started through a user interface operably coupled with a computing system of the apparatus and/or through any other method. As provided herein, at step 304, various parameters are inputted into the apparatus to define the building of one or more components. In such instances, the parameters relate to one or more devices operably coupled with the build controller are directed thereto. From the build controller, shared parameters of a print configuration (resin support speed, slurry thickness, etc.) may be directed to the shared components of the apparatus. In addition, different print configurations can be sent to each print module. The parameters related to the radiant energy sources, such as the images to be radiated by each of the radiant energy devices may be directed to the NAS device.

Next, at step (306), the build controller runs through a pre-print system check to assure that each sub-system of the apparatus that will be utilized is ready for starting a build. If any of the sub-systems do not pass the check, a notification is generated at step 308 and the method 300 may be restarted at step 302. In some instances, the notification is provided on the user interface.

If each of the sub-systems does pass the check at (306), the method 300 includes initializing communication between the build controller and each of the radiant energy devices at step 310. Once communication has been established at (310), the method 300, at step 312, can include setting the deposition assembly to an initial height. The initial height may be a pre-calibrated height and/or the defined thickness of the first layer of the one or more components to be built.

Next, at step 314, the method 300 can include transferring resin from a mixing assembly, or another source, to a reservoir of the deposition assembly. In some instances, the reservoir of the deposition may continue to receive resin until a predefined volume is detected.

At step 316, the method 300 can include initiating a resin support calibration translation in which the resin support is translated from the feed module to the take-up module. During resin support calibration translation, linear motion of the resin support may be calibrated based on the data provided by the first position sensor and/or the second position sensor. Additionally or alternatively, the resin thickness deposition assembly height can be calibrated based on the resin thickness measured by the thickness sensor.

At step 318, the method 300 can include determining whether a resin flush should be completed. The determination may be made based on detected variances in the thickness of the resin exceeds a predefined range of the thickness of the resin, as detected by the thickness sensor during step 316. The variations in thickness may be caused by particulate and/or a foreign object being present with the reservoir of the deposition assembly. If variations in the resin thickness are determined, the method 300, at step 320, may include flushing the resin. To flush the resin, a device or combination of devices that define a height of the resin on the resin support may be moved to an elevated height while the resin support is translated.

If at step 318 it is determined that a resin flush is not needed and/or after the resin flush at step 320, the method 300 can include performing a deposition assembly height adjustment. The height adjustment can be based on data provided by the thickness sensor during step 310 so that the requested resin casting thickness in the print parameter can be provided to one or more downstream print modules.

At step 324, the method 300 can include refilling the reservoir of the deposition assembly. In some instances, the reservoir of the deposition may continue to receive resin until a predefined volume is detected. In various examples, a volume sensor may be positioned within the deposition assembly that is configured to alert a user that the predefined volume has been obtained and/or the sensor may be operably coupled with a control valve that ceases movement of the resin from a vessel to the reservoir once the predefined volume has been obtained.

At step 326, the method 300 includes performing a resin support recoating. The recoating of the resin support can provide resin-coated resin support to each of the print modules that are to be used during a current indexing of the resin support. As provided herein, the system may build one or more components within each print module within the apparatus. Alternatively, less than all of the print modules may be used for a specific indexing of the resin support for various reasons. In instances in which various print modules are not in use for a specific indexing, the recoating area of the resin support may be reduced relative to the recoating area of the resin support when each of the print modules is in use.

Once the resin support is translated to place the resin within one or more print modules, at step 328, the method 300 can include activating the material retention assembly to retain the resin support in a predefined position within one or more print modules. In various embodiments, the material retention assembly may include a pneumatic assembly, a clamp, a combination thereof, and/or any other retention device.

At step 330, the method 300 can include loading a layer image within each of the radiant energy devices to be used during a specific indexing of the resin support. At step 332, the method 300 can include moving each respective stage of the print modules to be used during the first index to a layer-specific print position. As discussed herein, each print module may be configured to build a common or varied component from any of the other print modules. Based on the potential variance in layer number and/or component design, each of the stages may be moved to a common and/or varied height from any of the other stages within the apparatus.

Once each of the stages are moved to a layer-specific print position, at step 334, the method 300 can include commanding each of the energy sources to draw or flash the layer image of the cross section of the component onto the surface of the resin. Exposure to the radiation cures and solidifies the pattern in the resin and joins it to a previously-cured layer of the component. In some instances, the method 300 can include radiating a first image from a first radiant energy device at a first portion of resin positioned between the first radiant energy device and the first stage and a second image from a second radiant energy device at a second portion of resin positioned between the second radiant energy device and second first stage.

At step 336, the method 300 can include moving each respective stage of the print modules to be used during the first index to a separated position. As discussed herein, each print module may be configured to build a common or varied component from any of the other print modules. Based on the potential variance in layer number and/or component design, each of the stages may be moved to a common and/or varied height from any of the other stages within the apparatus.

At step 338, the method 300 can include deactivating the material retention assembly to release the resin support within one or more print modules.

At step 340, the method 300 can include determining whether an additional layer is to be formed for any of the one or more components within the apparatus. If any additional layers are to be formed, the method 300 can progress to step 342. At step 342, the control system may determine whether the resin support should be moved for a second index and/or whether a new resin thickness is needed for the second index. If the resin support should be moved for a second index and/or if a new resin thickness is needed for the second index, the method 300 may return to step 318. If the control system determines that the resin support should not be moved for a second index and/or a new resin thickness is not needed for the second index, the method 300, at step 344, may include conducting a resin support index move such that the resin support is translated by a short index distance to position a fresh resin-coated resin support section within each print module for the build of next layer.

Steps 328-344 may be performed to finish the build process layer-by-layer until a resin flush is to be performed. When a subsequent resin flush is to be performed, the method 300 may return to step 318. As the subsequent resin flush is performed at step 320, the thickness sensor data, first position sensor data, and/or second position data are recorded for the calibration of deposition assembly height and resin support linear translation distance for the next indexing.

If at step 340, the control system determines that the system has reached the last layer in the build process, the method 300 may continue to step 346. At step 346, the method 300 can include draining any remaining resin from the reservoir of the deposition assembly. In such instances, a valve within the deposition may be closed to prevent additional resin from being transferred to the reservoir. In addition, the device or combination of devices that define the height of the resin on the resin support may be moved to an elevated height while the resin support is translated to drain any remaining resin in the reservoir.

At step 348, once each the build process within a print module is complete, the respective stage may be raised to a preset removal position for component removal. Once each stage is raised, the method 300 may end at step 350. In some instances, a notification may be provided by the control system, such as to the user interface, indicating that the process has been completed and that each component is ready to be removed from the apparatus.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein, and may be generally referred to as "additive materials."

Aspects of the present disclosure are provided by the subject matter of the following clauses, which are intended to cover all suitable combinations unless dictated otherwise based on logic or the context of the clauses and/or associated figures and description:

An additive manufacturing apparatus comprising: a first print module including a first radiant energy device and a first stage configured to hold a first component; a second print module including a second radiant energy device and a second stage configured to hold a second component, wherein the first print module and the second print module are configured to receive at least a portion of a resin support between the first stage and the first radiant energy device and between the second stage and the second radiant energy device; and a control system configured to translate the resin support based on a condition of the first print module and the second print module through the first print module and the second print module.

The additive manufacturing apparatus of one or more of these clauses, wherein the first print module further includes a first actuator and a first build sensor, and wherein the second print module further includes a second actuator and a second build sensor.

The additive manufacturing apparatus of one or more of these clauses, wherein the first component has a first geometry and the second component has a second geometry, the first geometry being different from the second geometry.

The additive manufacturing apparatus of one or more of these clauses, wherein the control system includes a build controller operably coupled with a computing system, and wherein the build controller is further coupled with one or more control devices.

The additive manufacturing apparatus of one or more of these clauses, wherein the one or more control devices includes a first control device and a second control device, the first control device including a first communication line operably coupled with the build controller and a first operation bus operably coupled with the first print module, the second control device includes a second communication line operably coupled with the first control device and second operation bus operably coupled with the second print module.

The additive manufacturing apparatus of one or more of these clauses, wherein the build controller is operably coupled with a user interface.

The additive manufacturing apparatus of one or more of these clauses, wherein the control system further includes an energy device communication bus operably coupling one or more radiant energy devices to the computing system.

The additive manufacturing apparatus of one or more of these clauses, wherein a network-attached storage is operably coupled with the energy device communication bus and configured to store data related to one or more images to be emitted by the first radiant energy device or the second energy device.

The additive manufacturing apparatus of one or more of these clauses, wherein the control system is configured to receive defined parameters of a build process and images of each layer of the first component and the second component, and wherein the parameters are directed to the build controller while the images are provided to the network-attached storage.

A method of operating an additive manufacturing apparatus, the method comprising: providing parameters of a build process to a control system; performing a first indexing of a resin support having a resin applied thereto to translate the resin support a first linear distance into a first print module and a second print module; moving a first stage within the first print module to a first stage position based on the provided parameters to form a first layer of a first component; moving a second stage within the second print module to a second stage position based on the provided parameters to form a first layer of a second component; radiating a first image from a first radiant energy device at a first portion of resin positioned between the first radiant energy device and the first stage; and radiating a second image from a second radiant energy device at a second portion of resin positioned between the second radiant energy device and second first stage.

The method of one or more of these clauses, further comprising: calibrating a resin deposition assembly and a drive system prior to translating the resin support into the first print module and the second print module.

The method of one or more of these clauses, further comprising: determining a thickness of the resin on the resin support; and flushing the resin from a deposition assembly when a variance in the thickness exceeds a predefined range.

The method of one or more of these clauses, wherein the first stage position is offset from the second stage position in a Z-axis direction.

The method of one or more of these clauses, further comprising: performing a second indexing of the resin support to translate the resin support a second linear distance that is different than the first linear distance when a failure within the first print module or the second print module is detected.

The method of one or more of these clauses, further comprising: performing a second indexing of the resin support to translate the resin support a second linear distance that is different than the first linear distance when at least one of the first component or the second component is completed and the other of the first component or the second component is still being built.

The method of one or more of these clauses, wherein each of the first stage and the second stage are moved to a separated position prior to performing a second indexing of the resin support to translate the resin support a second linear distance.

An additive manufacturing apparatus comprising: a first print module including a first stage configured to hold a first component and a first radiant energy device; a second print module including a second stage configured to hold a second component and a second radiant energy device, wherein a resin support is configured to be positioned between the first stage and the first radiant energy device and between the second stage and the second radiant energy device; and a control system configured to translate the resin support based on a condition of the first print module and the second print module, the control system comprising: a build controller operably coupled with a computing system and one or more control devices; a user interface operably coupled with the build controller and the computing system, the user interface configured to receive one or more parameters; and an energy device communication bus operably coupled with the computing system in parallel with the build controller.

The additive manufacturing apparatus of one or more of these clauses, wherein the one or more control devices includes a first control device coupled with the build controller and a second control device coupled with the first control device.

The additive manufacturing apparatus of one or more of these clauses, wherein the one or more control devices includes a first control device and a second control device, the first control device including a first communication line operably coupled with the build controller and a first operation bus operably coupled with the first print module, the second control device includes a second communication line operably coupled with the first control device and second operation bus operably coupled with the second print module.

The additive manufacturing apparatus of one or more of these clauses, wherein the first print module and the second print module are coupled with the build controller in series, and wherein the first radiant energy device and the second energy device are coupled with the computing system in series.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an additive manufacturing apparatus, the method comprising:
    providing parameters of a build process to a control system;
    performing a first indexing of a resin support having a resin applied thereto to translate the resin support a first linear distance into a first print module and a second print module;
    moving a first stage within the first print module to a first stage position based on the provided parameters to form a first layer of a first component;
    moving a second stage within the second print module to a second stage position based on the provided parameters to form a first layer of a second component;
    radiating a first image from a first radiant energy device at a first portion of resin positioned between the first radiant energy device and the first stage; and
    radiating a second image from a second radiant energy device at a second portion of resin positioned between the second radiant energy device and second stage.

2. The method of claim 1, further comprising:
    calibrating a resin deposition assembly and a drive system prior to translating the resin support into the first print module and the second print module.

3. The method of claim 1, further comprising:
    determining a thickness of the resin on the resin support; and
    flushing the resin from a deposition assembly when a variance in the thickness exceeds a predefined range.

4. The method of claim 1, wherein the first stage position is offset from the second stage position in a Z-axis direction.

5. The method of claim 1, further comprising:
    performing a second indexing of the resin support to translate the resin support a second linear distance that is different than the first linear distance when a failure within the first print module or the second print module is detected.

6. The method of claim 1, further comprising:
    performing a second indexing of the resin support to translate the resin support a second linear distance that is different than the first linear distance when at least one of the first component or the second component is completed and the other of the first component or the second component is still being built.

7. The method of claim 1, wherein each of the first stage and the second stage are moved to a separated position prior to performing a second indexing of the resin support to translate the resin support a second linear distance.

8. An additive manufacturing apparatus comprising:
    a first print module including a first radiant energy device and a first stage configured to hold a first component;
    a second print module including a second radiant energy device and a second stage configured to hold a second component, wherein the first print module and the second print module are configured to receive at least a portion of a resin support between the first stage and the first radiant energy device and between the second stage and the second radiant energy device; and
    a control system configured to translate the resin support based on a condition of the first print module and the second print module through the first print module and the second print module.

9. The additive manufacturing apparatus of claim 8, wherein the first print module further includes a first actuator and a first build sensor, and wherein the second print module further includes a second actuator and a second build sensor.

10. The additive manufacturing apparatus of claim 8, wherein the first component has a first geometry and the second component has a second geometry, the first geometry being different from the second geometry.

11. The additive manufacturing apparatus of claim 8, wherein the control system includes a build controller operably coupled with a computing system, and wherein the build controller is further coupled with one or more control devices.

12. The additive manufacturing apparatus of claim 11, wherein the one or more control devices includes a first control device and a second control device, the first control device including a first communication line operably coupled with the build controller and a first operation bus operably coupled with the first print module, the second control device includes a second communication line operably coupled with the first control device and a second operation bus operably coupled with the second print module.

13. The additive manufacturing apparatus of claim 11, wherein the build controller is operably coupled with a user interface.

14. The additive manufacturing apparatus of claim 11, wherein the control system further includes an energy device communication bus operably coupling one or more radiant energy devices to the computing system.

15. The additive manufacturing apparatus of claim 14, wherein a network-attached storage is operably coupled with the energy device communication bus and configured to store data related to one or more images to be emitted by the first radiant energy device or the second energy device.

16. The additive manufacturing apparatus of claim 15, wherein the control system is configured to receive defined parameters of a build process and images of each layer of the first component and the second component, and wherein the parameters are directed to the build controller while the images are provided to the network-attached storage.

17. An additive manufacturing apparatus comprising:
    a first print module including a first stage configured to hold a first component and a first radiant energy device;
    a second print module including a second stage configured to hold a second component and a second radiant energy device, wherein a resin support is configured to be positioned between the first stage and the first radiant energy device and between the second stage and the second radiant energy device; and
    a control system configured to translate the resin support based on a condition of the first print module and the second print module, the control system comprising:
        a build controller operably coupled with a computing system and one or more control devices;
        a user interface operably coupled with the build controller and the computing system, the user interface configured to receive one or more parameters; and an energy device communication bus operably coupled with the computing system in parallel with the build controller.

18. The additive manufacturing apparatus of claim 17, wherein the one or more control devices includes a first control device coupled with the build controller and a second control device coupled with the first control device.

19. The additive manufacturing apparatus of claim 18, wherein the one or more control devices includes a first control device and a second control device, the first control device including a first communication line operably coupled with the build controller and a first operation bus operably coupled with the first print module, the second control device includes a second communication line operably coupled with the first control device and a second operation bus operably coupled with the second print module.

20. The additive manufacturing apparatus of claim 19, wherein the first print module and the second print module are coupled with the build controller in series, and wherein the first radiant energy device and the second energy device are coupled with the computing system in series.

* * * * *